US012562991B2

(12) United States Patent
Wei et al.

(10) Patent No.: US 12,562,991 B2
(45) Date of Patent: Feb. 24, 2026

(54) JOINT OPTIMIZATION METHOD FOR PATH SELECTION AND GATE SCHEDULING IN TIME-SENSITIVE NETWORKING

(71) Applicant: CHONGQING UNIVERSITY OF POSTS AND TELECOMMUNICATIONS, Chongqing (CN)

(72) Inventors: Min Wei, Chongqing (CN); Xingbin Fang, Chongqing (CN); Mengfei You, Chongqing (CN); Chengjie Huo, Chongqing (CN); Ping Wang, Chongqing (CN); Wei Xu, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 18/713,647

(22) PCT Filed: May 7, 2022

(86) PCT No.: PCT/CN2022/091458
§ 371 (c)(1),
(2) Date: May 26, 2024

(87) PCT Pub. No.: WO2023/134091
PCT Pub. Date: Jul. 20, 2023

(65) Prior Publication Data
US 2025/0023821 A1 Jan. 16, 2025

(30) Foreign Application Priority Data

Jan. 17, 2022 (CN) .......................... 202210058869.6

(51) Int. Cl.
H04L 47/125 (2022.01)
H04L 45/24 (2022.01)
H04L 45/302 (2022.01)

(52) U.S. Cl.
CPC ............ *H04L 47/125* (2013.01); *H04L 45/24* (2013.01); *H04L 45/306* (2013.01)

(58) Field of Classification Search
CPC ...... H04L 45/24; H04L 45/306; H04L 47/125
See application file for complete search history.

(56) References Cited

U.S. PATENT DOCUMENTS

2022/0353195 A1 11/2022 Wei et al.

FOREIGN PATENT DOCUMENTS

CN 103336999 B * 8/2016
CN 111740924 A 10/2020
(Continued)

OTHER PUBLICATIONS

Yang Wang et al. "A time-sensitive network scheduling algorithm based on improved ant colony optimization", Alexandria Engineering Journal (2021) 60, 107-114, 8 pages. (Year: 2021).*
(Continued)

*Primary Examiner* — G. C. Neurauter, Jr.
(74) *Attorney, Agent, or Firm* — Yue (Robert) Xu; Apex Attorneys at Law, LLP

(57) ABSTRACT

A joint optimization method for path selection and gate scheduling in time-sensitive networking comprises S1, a CNC finding a TSN topology, and abstracting same into a network directed graph; S2, a terminal device sending to a CUC a TSN connection request, and the CUC sending same to the CNC; S3, the CNC selecting K shortest paths as alternative paths; S4, the CNC selecting m preferred paths; S5, the CNC finding an optimal transmission path for a TT stream, and finding a proper transmission path for a non-TT
(Continued)

stream; S6, CNC completing traversal; S7, configuring a gate control list for the optimal transmission path of each pair of terminal devices; and S8, the CNC encapsulating a computation result into a gate scheduling table, configuring the gate scheduling table to a TSN switch, and then sending a traffic transmission computation result to the TSN terminal device.

7 Claims, 6 Drawing Sheets

(56)                    References Cited

FOREIGN PATENT DOCUMENTS

| | | | | | |
|---|---|---|---|---|---|
| CN | 113068263 | A | | 7/2021 | |
| CN | 113300956 | A | | 8/2021 | |
| CN | 114172843 | A | | 3/2022 | |
| CN | 110808911 | B | * | 5/2022 | ............ H04L 45/02 |
| CN | 115617510 | A | * | 1/2023 | ............ G06F 9/505 |
| EP | 3869752 | A1 | | 8/2021 | |
| WO | 2021192603 | A1 | | 9/2021 | |
| WO | 2021227245 | A1 | | 11/2021 | |

OTHER PUBLICATIONS

International Search Report for PCT/CN2022/091458 mailed Sep. 27, 2022, ISA/CN.

* cited by examiner

JOINT OPTIMIZATION METHOD FOR PATH SELECTION AND GATE SCHEDULING IN TIME-SENSITIVE NETWORKING

This application is the national phase of International Patent Application No. PCT/CN2022/091458, titled "JOINT OPTIMIZATION METHOD FOR PATH SELECTION AND GATE SCHEDULING IN TIME-SENSITIVE NETWORKING", filed on May 7, 2022, which claims the priority to Chinese Patent Application No. 202210058869.6, titled "JOINT OPTIMIZATION METHOD FOR PATH SELECTION AND GATE SCHEDULING IN TIME-SENSITIVE NETWORKING", filed on Jan. 17, 2022 with the Chinese Patent Office, both of which are incorporated herein by reference in their entireties.

FIELD

The present disclosure relates to the technical field of time-sensitive networking, and in particular to a joint optimization method for path selection and gate scheduling in time-sensitive networking.

BACKGROUND

With the development of the industrial internet technology, deterministic real-time communication is introduced to the aerospace field and the industrial automation field to ensure the performance of time critical streams and the security of the system. Time-sensitive networking (TSN) is a set of standards developed by the Time-Sensitive Networking Task Force (TSN TG) of the IEEE 802.1 working group for performing real-time communication in Ethernet networks with bounded latency and jitter. TSN brings industrial level robustness to the 15 Ethernet networks, facilitating real-time and security critical applications (such as Industry 4.0 and network physical systems), and supporting time critical traffic and best effort traffic on a public communication infrastructure. It is worth noting that IEEE 802.1Qbv defines a programmable gate control mechanism, that is, a time aware shaper, which uses time transfer gates and gate control lists (GCLs) to determine which queue is selected for transmission. In addition, the time of all devices should be synchronized based on IEEE 802.1AS-Rev to ensure successful deployment of the time aware shapers (TAS). Although IEEE 802.1Qbv clearly defines the gate control mechanism, further research is needed to develop the scheduling configuration and related methods for deterministic end-to-end latency.

Various data streams, including TT streams and non-TT streams (such as audio streams, video streams, and BE (Best Effort) streams) may be transmitted in the time-sensitive networking. TT streams are usually applied in a periodic real-time application, such as a time sensitive control application strictly restricting the maximum end-to-end latency. The transmission of the TT streams is periodic, and the transmission of the non-TT streams is non-periodic. For the deterministic real-time transmission scheduling of TT streams in the time-sensitive networking, the current modeling methods mainly include: an integer linear programming (ILP) method, a satisfiability modulo theories (SMT) method, an optimization modulo theories (OMT) method, and the like. The ILP method and SMT/OMT method both achieve deterministic real-time communication transmission of TT streams by constructing a series of constraints, where the constraint expression constructed by the SMT method is a first-order logical formula according to a corresponding theory. In complex network topologies, it is necessary to determine transmission paths of TSN streams before performing transmission scheduling. However, the existing research uses fixed transmission paths of the TSN streams, resulting in a small space for the solutions of scheduling, which makes it difficult to obtain a global optimal solution, and may even obtain a scheduling solution that cannot be achieved although the network is actually schedulable.

In summary, the scheduling mechanism defined in the TSN standard does not solve the problem of how to improve the operation efficiency of time-sensitive networking having multi-paths and multi-inputs/outputs, and how to provide a joint optimization method for path planning and gate scheduling, and very little research has been carried out to solve this problem.

SUMMARY

In view of this, to solve the problem of transmission performance degradation caused by congestion or faults of a single path, a joint optimization method for path selection and gate scheduling in a time-sensitive networking is provided according to the present disclosure, meeting the transmission requirements of large-scale time-sensitive networking. According to the present disclosure, optimal transmission paths are planned for TT streams and transmission paths are planned for non-TT streams in a TSN network, a stream transmission constraint is configured, and a gate control list is configured for the optimal transmission paths of the TT streams, thereby solving the problem of traffic conflicts caused by transmission link overlap in transmitting the TT streams.

To achieve the above objectives, the following technical solutions are provided according to the present disclosure.

A joint optimization method for path selection and gate scheduling in time-sensitive networking includes:

S1: discovering, by a centralized network configuration module CNC, a TSN network topology, and abstracting, by the CNC, a network directed graph from the TSN network topology;

S2: transmitting, by a terminal device, a TSN connection request to a centralized user configuration module CUC through a user configuration protocol, and transmitting, by the CUC, the TSN connection request to the CNC via a user network interface UNI;

S3: selecting, by the CNC in response to a path selection request, K shortest paths as preselected paths based on a fused path selection and gate scheduling algorithm;

S4: selecting, by the CNC, m preferred paths from the K preselected paths based on a path criticality;

S5: using, by the CNC, the m preferred paths as an input to a path selecting stage to determine an optimal transmission path for TT streams between a pair of a sender and a receiver based on TSN stream features, link transmission costs and pheromone updating rules; storing, by the CNC, the optimal transmission path in a path information table ω; and determining, by the CNC, a transmission path for non-TT streams;

S6: performing, by the CNC, a traversal process to determine whether there still exists a pair of sender and receiver for which the optimal transmission path has not yet been calculated; in case that there exists a pair of sender and receiver for which the optimal transmission path has not yet been calculated, proceeding to S3 to S6, wherein all calculated optimal transmission paths of TT streams between all pairs of senders to receivers are stored in the path information table ω; and in a case that there is no path between the sender and the receiver that has not yet been calculated, proceeding to S7;

S7: using the optimal transmission path information table ω for the TT streams as an input, configuring a stream transmission constraint to calculate a gate control list for each of the optimal transmission paths of all pairs of senders to receivers; and S8: encapsulating, by the CNC, a calculated result into a gate scheduling table; configuring, by the CNC, the gate scheduling table to a TSN switch; and transmitting, by the CNC, a stream transmission calculation result to a TSN terminal device via the CUC.

In an embodiment, in S1, the CNC discovers the TSN network topology through a link discovery protocol LLDP, and abstracts the network directed graph from the TSN network topology by using a network modeling algorithm;

the TSN network topology is represented as the directed graph of G=(V, E), where V represents a node set in the TSN and V≡(S∪H), S represents a TSN switch set, H represents a terminal device set, E represents an edge set, is a set of binary tuples, and represents all links in the TSN, and E≡{(BR$_i$,BR$_j$)|BR$_i$, BR$_j$ ∈ V, BR$_i$≠BR$_j$ and BR$_i$ is related with BR$_j$, where (BR$_i$,BR$_j$) represents a link between a switch BR$_i$ and a switch BR$_j$;

each of links (BR$_i$,BR$_j$)∈E is associated with a measurement value list that is represented by a tuples (b, ld), where b∈ $\mathbb{R}^+$ and represents a remaining bandwidth of the (BR$_i$,BR$_j$), Id∈ $\mathbb{R}^+$ and represents a link delay including d$_{BR_i}^{proc}$, d$_{BR_i}^{prop}$ and d$_{BR_i,BR_j}^{prop}$, and ld$_{BR_i, BR_j}$ is bounded;

a stream is an ordered data sequence transmitted from the sender to the receiver according to a requirements; a set of all TSN streams is represented as F; for each of the TSN streams, main parameters include: a transmission path R$_i$ of the TSN stream, an end-to-end delay D$_i$ of the TSN stream, a transmission period T$_i$ of the TSN stream, and a size S$_i$ of the TSN stream; and each of the TSN streams F$_i$ is represented as a quadruple F$_i$=(R$_i$, D$_i$, T$_i$, S$_i$); and a path between an i-th pair of a sender ES$_i$ and a receiver ES'$_i$ includes n switches BR$_1$, BR$_2$, . . . , BR$_n$, and is represented as R$_i$={ES$_i$, BR$_1$, BR$_2$, . . . , BR$_n$, ES$_i'$}, and a maximum length of frame is a maximum transmission unit MTU of an Ethernet.

In an embodiment, in S2, the terminal device, through the user configuration protocol, transmits the number K of the preselected paths, the number m of the preferred paths selected based on the path criticality ηk, the maximum number N$_{cyc}$ of cycles of the algorithm, the maximum number N$_{ant}$ of ant, the total quantity Q of pheromones, the transmission period T$_i$ of the TSN stream, the size S$_i$ of the TSN stream, and the delay D$_i$ of the TSN stream to the CUC, and the CUC transmits the connection request to the CNC via the user network interface UNI.

In an embodiment, the selecting K shortest paths as preselected paths in S3 includes:

sorting, by using a K-shortest path algorithm KSP, shortest paths in an ascending order for each pair of ES$_i$, ES'$_i$∈ H;

inputting the network directed graph G, the sender ES$_i$, the receiver ES'$_i$, and the number K of the paths, and outputting a set p$_K$ of the K paths; and using the set p$_K$ of the K paths as an input for S4;

where S3 comprises:

S31: inputting the network directed graph G, the sender ES$_i$, the receiver ES'$_i$, and the number K of the preselected paths;

S32: calculating, by the CNC, a shortest path between ES$_i$ and ES'$_i$ using the fused path selection and gate scheduling algorithm; and recording the shortest path as:

$$p_n(n = 1): \ p_n = ES_i \rightarrow BR_a \rightarrow BR_b \rightarrow \ldots \rightarrow BR_n \rightarrow ES_i'$$

S33: determining whether n is less than or equal to K and there are still other candidate paths, where in a case that n is less than or equal to K and there are still candidate paths, the process proceeds to S34, and in a case that n is greater than K or there is no other candidate path, it indicates that the K preselected paths are determined;

S34: with the calculated p$_n$, calculating p$_{n+1}$ based on deviation points and a Dijkstra algorithm, where the deviation points are nodes located on p$_n$, excluding the receiver ES'$_i$, the number of the deviation points is x, and the deviation points are represented as BR$_i$(i=1, 2, . . . , x);

S35: traversing the deviation points, where the deviation points are traversed starting from BR$_i$ (i=0), and a shortest path from BR$_i$ to the receiver ES'$_i$ is calculated for each of the deviation points;

S36: using a path from a starting point to BR$_i$ on p$_n$ plus the shortest path from BR$_i$ to the receiver ES'$_i$ as a candidate path for determining p$_{n+1}$, and recording the candidate path in a candidate path list U;

S37: stopping traversing the deviation points;

S38: determining whether the candidate path list U is empty;

S39: in a case that the candidate path list U is not empty, determining a path with a least weight in B as p$_{n+1}$ after traversing all the deviation points, removing the path from U, and recording the path in a preselected path list L; where after determining the p$_{n+1}$, if n+1≤K, the process proceeds to steps S33 to S38, and if n+1>K, it indicates that K preselected paths are determined; and S310: in a case that the candidate path list U is empty (indicating that K preselected paths are determined, determining the set of the paths as P$_k$={p$_1$, p$_2$, . . . , p$_n$, p$_k$}∈P$_{sd}$, where P$_{sd}$ represents a set of paths from BR$_i$ to ES'$_i$.

In an embodiment, in S4, the number HC of hops of a path p$_k$ is represented by p$_k$. HC and is equal to the number of TSN switches on the path p$_k$ excluding a sender and a receiver, and is expressed as:

$$p_k \cdot HC = len(p_k) - 2 \tag{1}$$

a remaining bandwidth SBW of the path p$_k$ is equal to a minimum remaining bandwidth of all links included in the path p$_k$, and p$_k$={ES$_i$, BR$_1$, BR$_2$, . . . , BR$_n$, ES'$_i$} and S=len(p$_k$)−2, the remaining bandwidth SBW of the path p$_k$ is expressed as:

$$p_k \cdot SBW = \begin{cases} \min(b_{ES_i,BR_S}, b_{BR_S,ES_i'}) & S = 1 \\ \min(b_{ES_i,BR_1}, b_{BR_S,ES_i'}, b_{BR_1,BR_2}) & S = 2 \\ \min(\min_{i=1}^{S-1} b_{BR_i,BR_{i+1}}, b_{ES_i,BR_1}, b_{BR_S,ES_i'}) & S \geq 3 \end{cases} \tag{2}$$

5 an end-to-end delay DL of the path $p_k$ is equal to a sum of delays $ld_{BR_i,BR_{i+1}}$ of the links included in the path $p_k$, and is expressed as:

$$p_k \cdot DL = \begin{cases} ld_{ES_i,BR_S} + ld_{BR_S,ES'_i} & S = 1 \\ \sum_{i=1}^{S-1} ld_{BR_i,BR_{i+1}} + ld_{ES_i,BR_1} + ld_{BR_S,ES'_i} & S \geq 2 \end{cases} \quad (3)$$

a function $\Delta(HC,SBW,DL)$ is used to map a path criticality $\eta_k$ of the path $p_k$ to a value ranging from 0 to 1, a path with a maximum $\eta_k$ is selected from the set $p_k$ of the preselected paths as an input path in a path selecting stage, and for the path $p_k \in P_{sd}$, $\eta_k$ is expressed as:

$$\eta_k = p_k \cdot \Delta(HC, SBW, DL) = \omega_1 \frac{HC_{min}}{HC} + \omega_2 \frac{SBW}{SBW_{max}} + \omega_3 \frac{DL_{min}}{DL} \quad (4)$$

$$\omega_1 + \omega_2 + \omega_3 = 1 \quad (5)$$

where $\Sigma_{j=1}^3 \omega_j = 1$, $SBW_{max}$ represents a maximum SBW of all paths $p_k \in P_{sd}$, $HC_{min}$ represents a minimum HC of all the paths $p_k \in P_{sd}$, $DL_{min}$ represents a minimum DL of all the paths $p_k \in P_{sd}$, and a greater $\eta_k$ indicates a smaller number of hops in the network, a greater remaining bandwidth and a less network delay; and the path criticality $\eta_k$ is calculated for each of the path $p_k$, top m paths with maximum $\eta_k$ are determined as the preferred paths and are recorded in a preferred path set $R_{ant}$.

In an embodiment, the determining an optimal transmission path in S5 is performed by using an ant colony algorithm in S5, including:

S51: configuring initialization parameters by outputting an initial path table $R_{ant}$ for the fused path selection and gate scheduling algorithm to a path preselecting stage, and configuring an ant taboo table $R_b$, the maximum number $N_{cyc}$ of cycles of the algorithm, the maximum number $N_{ant}$ of ant, and the total quantity Q of pheromones;

S52: determining the type of the stream, respectively configuring impact factors $\alpha$ and $\beta$, link weight factor $\delta$ and $\varepsilon$, pheromone volatility coefficient $\rho$, and pheromone increment $\Delta\tau$ for the TT stream and for the non-TT stream, placing an ant at the sender, and recording the sender in $R_b$;

S53: updating the number of cycles by $n_{cyc}=n_{cyc}+1$;

S54: updating the number of the ant by $n_{ant}=n_{ant}+1$;

S55: selecting, by the ant, a next node using the following equation (6):

$$P(BR_i, BR_j) = \quad (6)$$

$$\begin{cases} \dfrac{\tau(BR_i, BR_j)^\alpha \times \mu(BR_i, BR_j)^\beta}{\sum_{BR_Q \in allow_a} \tau(BR_i, BR_Q)^\alpha \times \mu(BR_i, BR_Q)^\beta}, & BR_j \in allow_a \\ 0, & BR_j \notin allow_a \end{cases}$$

$$\mu(BR_i, BR_j) = \delta \times b_{BR_i,BR_j} + \frac{\varepsilon}{ld_{BR_i,BR_j}} \quad (7)$$

where $P(BR_i,BR_j)$ represents a transmission probability of an ant a from a node $BR_i$ to a node $BR_j$; $allow_a$ represents a set of links from a node to a next node; a

6 greater $\alpha$ indicates a stronger guiding role of the pheromones; a greater $\beta$ indicates a greater influence of path distance information on the ant making a decision and the more greedy on a current effect; $\delta$ and $\varepsilon$ represents weight factors, $\delta+\varepsilon=1$, $0<\delta<1$, $0<\varepsilon<1$, $\delta$ and $\varepsilon$ are determined based on the current type of stream, and $\delta$ is less than $\varepsilon$ in a case of TT stream; $\tau(BR_i,BR_j)$ represents the amount of pheromones of a link $(BR_i, BR_j)$; $\mu(BR_i,BR_j)$ represents a heuristic factor for node selection; $b_{BR_i, BR_j}$ represents a remaining bandwidth of the link $(BR_i,BR_j)$; and $ld_{BR_i,BR_j}$ represents a delay of the link $(BR_i,BR_j)$;

S56: determining whether the ant reaches the receiver; in a case that the ant does not reach the receiver, proceeding to S55; and in a case that the ant reaches the receiver, recording a path traveled by the ant in a path table $R_{te}$, recording nodes of the path in the taboo table $R_b$ to avoid crossing with a path of another ant, and proceeding to S57;

S57: determining whether $n_{ant}$ is equal to $N_{ant}$; in a case that $n_{ant}<N_{ant}$, proceeding to S54; and in a case that $n_{ant}=N_{ant}$, selecting a path having a lowest transmission cost TV from $R_{te}$ as an optimal path obtained for the current cycle, recording the path in a best path set R, and proceeding to S58;

S58: determining whether $n_{cyc}$ is equal to $N_{cyc}$; in a case that $n_{cyc}\neq N_{cyc}$, proceeding to S53, updating the pheromones in the link using the following equation (8), and clearing $R_b$; and in a case that $n_{cyc}=N_{cyc}$, proceeding to S59;

$$\tau(BR_i, BR_j) = \begin{cases} (1-\rho)\times\tau(BR_i, BR_j) + \Delta\tau(BR_i, BR_j) & (BR_i, BR_j) \in R_{ant} \quad (8) \\ (1-\rho)\times\tau(BR_i, BR_j) & (BR_i, BR_j) \notin R_{ant} \end{cases}$$

where $\rho$ represents the pheromone volatility coefficient, and $0<\rho<1$; $\tau(BR_i,BR_j)$ represents the amount of pheromones of the link $(BR_i,BR_j)$; and $\Delta\tau(BR_i,BR_j)$ represents the pheromone increment of the link $(BR_i,BR_j)$, which is determined based on the type of the TSN data stream, and is expressed as:

$$\quad (9)$$

$$\Delta\tau(BR_i, BR_j) = \begin{cases} \dfrac{Q}{\sum_{i=1}^{n}\sum_{j=1}^{n}\left[ld_{(BR_i,BR_j)}\times\varsigma(BR_i, BR_j)\right]} & TT \text{ stream} \\ \dfrac{Q}{\min\left(b_{(BR_i,BR_j)}\times\varsigma(BR_i, BR_j)\right)} & non\text{-}TT \text{ stream} \end{cases}$$

where Q represents the total quantity of the pheromones; $ld_{(BR_i, BR_j)}$ represents the transmission delay of the link $(BR_i, BR_j)$; and a path selection coefficient $\varsigma(BR_i,BR_j)$ is expressed as:

$$\varsigma(BR_i, BR_j) = \begin{cases} 1 & (BR_i, BR_j) \in R_{ant} \\ 0 & (BR_i, BR_j) \notin R_{ant} \end{cases} \quad (10)$$

S59: outputting an optimal transmission path for the TT streams and an optimal transmission path for the non-TT streams based on the type of the TSN stream, where in a case of the TT streams $f_i$, a path with a minimum delay is selected from the path set R as the optimal path which is represented as $R_{TT}{}^i$ stream; and in a case of the non-TT streams $f_i'$, $N_{non-TT\ stream}$ paths are selected from the path set R as optimal paths and are forwarded. In an embodiment, in S7:

a cycle period GC of the gate control list is expressed as:

$$GC = lcm(T) \qquad (11)$$

where 1 cm represents a least common multiple, and T represents time periods of all data streams and is expressed as:

$$T=\{f_0, T_0, f_1, T_1, \ldots, f_n, T_n\}$$

where $f_n$, $T_n$ represents a time period $T_n$ of a stream $f_n$; a time distance between subsequent frames of a stream $f_i \in F$ is always equal to $T_i$, a transmission offset of the TT stream $f_i$ on $(BR_i, BR_j)$ is $X_{f_i, BR_i, BR_j} \in E$, $f_i \in F_{BR_i, BR_j}$, an ID of a queue storing $F_{f_i, a, b}$ is $\lambda_{f_i, BR_i, BR_j}$, $(BR_i, BR_j) \in E$, and a time period $L_{f_i, BR_i, BR_j}$ for transmitting a data frame of the stream $f_i$ on the link $(BR_i, BR_j)$ is obtained by using the following equation (12):

$$L_{f_i, BR_i, BR_j} = \frac{8 \cdot p_i}{c_{BR_i, BR_j}} \qquad (12)$$

based on a GCL transmission rule, a length of a slot (LOS) is analyzed, and a maximum length of the slot is obtained by using the following equation (13):

$$MAX(LOS) = GCD(T) \qquad (13)$$

the maximum LOS is equal to a greatest common divisor of time periods of data streams;

a minimum length of the slot is obtained by using the following equation (14):

$$\min(LOS) = \frac{LOG}{c_{BR_i, BR_j}} + d_{BR_i}^{proc} + d_{BR_i}^{prop} + synPre \qquad (14)$$

where LOG represents a length of a transmission queue, and $$\frac{LOG}{c_{BR_i, BR_j}}$$

represents a time period for transmitting the last 1 byte to the link in a case that all queue resources are occupied;

a transmission path is expressed as $\{ES_i, BR_1, BR_2, \ldots, BR_n, ES'_i\}$, and a GCL cycle start time instant $\phi_{BR_n}$ of a switch $BR_n$ is calculated by using the following equation (15):

$$\phi_{BR_n} = r_{f_i}^F + L_{f_i, ES_i, BR_1} + \sum_{k=1}^{n} d_{BR_i}^{proc} + \qquad (15)$$

$$\sum_{k=1}^{n} d_{BR_i}^{prop} + \sum_{j=2}^{n} L_{f_i, BR_{j-1}, BR_j} + synPre$$

where $r_{f_i}^F$ represents a time instant at which the sender transmitting a first data frame, $L_{f_i, ES_i, BR_1}$ represents a time period for transmitting a data frame of the stream $f_i$ on a link $(ES_i, BR_1)$, $d_{BR_i}^{proc}$ represents a processing delay of $BR_i$, $d_{BR_i}^{prop}$ represents a transmission delay of $BR_i$, $L_{f_i, BR_{j-1}, BR_j}$ represents a time period for transmitting a data frame of the stream $f_i$ on a link $(BR_{j-1}, BR_j)$, and synPre represents a maximum difference in time synchronizations between two node devices;

a delay D from a switch to a next switch is expressed as:

$$D = d_{BR_n}^{proc} + d_{BR_{n-1}}^{prop} + d_{BR_{n-1}, BR_n}^{prop} \qquad (16)$$

where $d_{BR_n}^{proc}$ represents a processing delay of $BR_n$, $d_{BR_{n-1}}^{prop}$ represents a transmission delay of $BR_{n-1}$, and $d_{BR_{n-1}, BR_i}^{prop}$ represents a propagation delay in $(BR_{n-1}, BR_n)$;

an end-to-end delay constraint is expressed as:

$$\left(d_{ES_i, BR_j}^{prop} + d_{BR_i, ES_i'}^{prop}\right) + \Sigma_{i=1}^{j-1} d_{BR_i, BR_{i+1}}^{prop} + \Sigma_{i=1}^{j} d_{BR_i}^{proc} \leq D_i \qquad (17)$$

a frame constraint is expressed as:

$$\forall\ f_i \in F_i : \chi_{f_i, ES_i, BR_j} \geq r_{f_i} \qquad (18)$$

$$\forall\ f_i \in F_i : \chi_{f_i, BR_t, ES_i'} \geq \tilde{d}_i - L_{f_i, BR_t, ES_i'} - ld_{BR_t, ES_i'} \qquad (19)$$

a link constraint are expressed as:

$$\forall\ (BR_i, BR_j) \in E,\ \forall\ f_i, f_j \in F_{BR_i, BR_j},\ f_i < f_j, \qquad (20)$$

$$\forall\ \alpha \in \left\{0, \ldots, \frac{lcm(T_i, T_j)}{T_i} - 1\right\}, \forall\ \beta \in \left\{0, \ldots, \frac{lcm(T_i, T_j)}{T_j} - 1\right\}$$

$$\left(\chi_{f_i, BR_i, BR_j} + \alpha \times T_i \geq \chi_{f_j, BR_i, BR_j} + \beta \times T_j + L_{f_j, BR_i, BR_j}\right) \vee$$

$$\left(\chi_{f_j, BR_i, BR_j} + \beta \times T_j \geq \chi_{f_i, BR_i, BR_j} + \alpha \times T_i + L_{f_i, BR_i, BR_j}\right)$$

a frame isolation constraint without considering a transmission time period is expressed as:

$$\forall\ (BR_a, BR_b) \in E,\ \forall\ f_i, f_j \in F_{BR_a, BR_b},\ f_i < f_j, \qquad (21)$$

$$\forall\ \Gamma \in \left\{0, \ldots, \frac{lcm(T_i, T_j)}{T_i} - 1\right\}, \forall\ \xi \in \left\{0, \ldots, \frac{lcm(T_i, T_j)}{T_j} - 1\right\} :$$

$$\left(h_{f_i, x} \leq h_{f_j, y} - synPrec\right) \vee \left(h_{f_j, y} \leq h_{f_i, x} - synPrec\right) \vee$$

$$\left(\lambda_{f_i, BR_a, BR_b} \neq \lambda_{f_j, BR_a, BR_b}\right)$$

where $$h_{f_i, x} = \chi_{f_i, BR_x, BR_a} + \Gamma \times T_i + L_{f_i, BR_x, BR_a} + ld_{BR_x, BR_a} \qquad (22)$$

$$h_{f_j, y} = \chi_{f_j, BR_y, BR_a} + \xi \times T_j + L_{f_j, BR_y, BR_a} + ld_{BR_y, BR_a} \qquad (23)$$

$$o_{f_i, a} = \chi_{f_i, BR_a, BR_b} + \Gamma.T_i \qquad (24)$$

$$o_{f_j, a} = \chi_{f_j, BR_a, BR_b} + \xi.T_j \qquad (25)$$

a frame isolation constraint considering a transmission time period is expressed as:

$$\forall \, (BR_a, BR_b) \in E, \, \forall \, f_i, f_j \in F_{BR_a, BR_b}, \, f_i < f_j, \quad (26)$$

$$\forall \, \Gamma \in \left\{ 0, \, ..., \, \frac{lcm(T_i, T_j)}{T_i} - 1 \right\}, \, \forall \, \xi \in \left\{ 0, \, ..., \, \frac{lcm(T_i, T_j)}{T_j} - 1 \right\} :$$

$$\left( 0_{f_i, a} \le h_{f_j, y} - synPrec \right) \vee \left( 0_{f_j, a} \le h_{f_i, x} - synPrec \right) \vee$$

$$\left( \lambda_{f_i, BR_a, BR_b} \ne \lambda_{f_j, BR_a, BR_b} \right)$$

a stream transmission constraint is expressed as:

$$\forall \, f_i \in F_i, \, \forall \, (BR_x, BR_a), (BR_a, BR_b) \in E, \, f_i \in F_{BR_x, BR_a} \cap F_{BR_a, BR_b} : \quad (27)$$

$$\chi_{f_i, BR_a, BR_b} \ge \chi_{f_i, BR_x, BR_a} + L_{f_i, BR_x, BR_a} + d_{BR_a} + synPrec$$

an optimization objective is expressed as:

$$\forall \, f_i \in F_i : \varpi = \frac{\chi_{f_i, BR_t, ES_i'} + L_{f_i, BR_t, ES_i'} + ld_{BR_t, ES_i'} - \chi_{f_i, ES_i, BR_j}}{T_i} \quad (28)$$

$$0 \le \varpi \le 1$$

an auxiliary variable ω represents a ratio of an end-to-end delay of a stream to a time period of the stream, and optimal scheduling is achieved in a case that $\overline{\omega}$ is within [0,1]; and a solver is used to solve, under the above constraints, a gate control list of switches for each of the optimal transmission paths $R_{TT\ stream}{}^i = \{ES_i, BR_a, BR_b, \ldots, BR_n, ES'_i\}$ of TT streams between all pairs of terminal devices.

The following beneficial effects can be achieved with the technical solutions in the present disclosure. Based on the transmission features of the TT streams and the non-TT streams in TSN, the optimal path is preferably selected for TT streams to ensure the transmission of the TT streams, and then a transmission path is planned for the non-TT streams, thereby achieving good network transmission performance.

The other advantages, objectives, and features of the present disclosure are to be described in the following specification. The other advantages, objectives, and features are apparent to those skilled in the art in view of the following description, or may be taught from the practice of technical solutions in the present disclosure.

BRIEF DESCRIPTION OF THE DRAWINGS

In order to make the purpose, technical solutions, and advantages of the present disclosure clearer, a detailed description of preferred embodiments of the present disclosure are provided below in conjunction with the accompanying drawings. In the drawings.

DETAILED DESCRIPTION OF THE EMBODIMENTS

Figure 1:
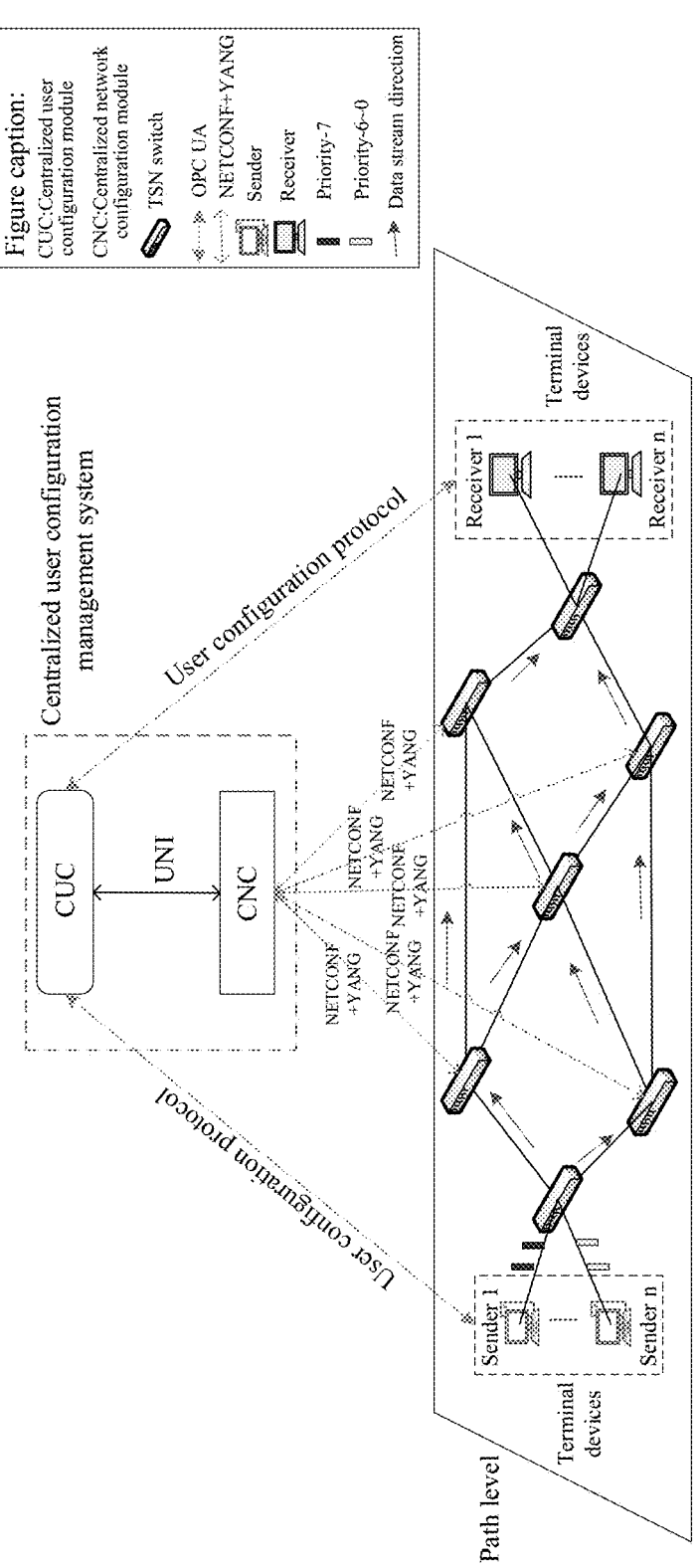
FIG. 1 is a schematic diagram showing an architecture of a TSN network.

Hereinafter, the implementation of the present disclosure is illustrated based on specific embodiments. Those skilled in the art may easily understand the other advantages and benefits of the present disclosure from the content disclosed in this specification. The present disclosure may also be implemented or applied through different specific embodiments, and the details in this specification may be improved or modified based on different perspectives and applications without departing from the spirit of the present disclosure. It should be noted that the illustrations provided in the following embodiments only illustrate the basic concept of the present disclosure. Without conflict, the following embodiments and the features in the embodiments may be combined with each other.

The accompanying drawings are only used for illustrative purposes and show only schematic diagrams not physical images, which should not be understood as a limitation to the present disclosure. In order to better illustrate the embodiments of the present disclosure, some components in the drawings may be omitted, enlarged or reduced, which do not represent actual sizes of a product. For those skilled in the art, it is understandable that some well-known structures and explanations of these structures in the drawings may be omitted.

The same or similar symbols in the drawings of the embodiments of the present disclosure correspond to the same or similar components. In the description of the present disclosure, it should be understood that the terms, such as "up", "down", "left", "right", "front" and "back", indicate orientation or positional relationships based on the orientation or positional relationships shown in the drawings, which are only for the convenience of describing and not for indicating or implying that the device or components referred to must have a specific orientation, be constructed and operated in a specific orientation. Therefore, the terms used to describe the positional relationship in the attached drawings are only for illustrative purposes and cannot be understood as a limitation of the present disclosure. Those skilled in the art can understand the specific meanings of the above terms based on specific situations.

FIG. 1 shows architecture of a TSN network according to the present disclosure. In a case that a sender intends to send a TSN stream to a receiver, the following operations are performed.

(1) The sender, through a user configuration protocol (such as OPC UA), sends a TSN connection request to a centralized user configuration module (CUC). The request includes a topology of the TSN network, a stream transmission requirement, and other information.

(2) The CUC converts the TSN connection request to a TSN connection requirement, and transmits the TSN connection requirement to a centralized network configuration module (CNC) via a user network interface (UNI).

(3) In response to the TSN connection requirement, the CNC calculates, using a fused path selection and gate scheduling algorithm according to the present disclosure, an optimal transmission path meeting the connection requirement and feasible transmission scheduling.

(4) In a case that the optimal transmission path and a scheduling table are obtained, the CNC configures all TSN switches on the calculated path using the calculated scheduling table.

(5) The CNC transmits a transmission time table to the CUC, and transmits the transmission time table to the sender.

(6) The sender transmits a TSN stream along the selected path to the receiver according to the calculated transmission scheduling.

The present disclosure provides a fused path selection and gate scheduling algorithm for the CNC calculating the path and the transmission scheduling in the above step (3). The method includes four stages: a network modeling stage, a path preselecting stage, a path selecting stage and a gate designing stage, which are described in detail below.

In the network modeling stage, the CNC performs network modeling based on the topology of the network and the TSN stream features, which is preparation for subsequent stages.

In the path preselecting stage, in response to the connection requirement from the CUC, the CNC, based on the topology of the network, selects K preselected paths by using the fused path selection and gate scheduling algorithm, and then selects m (m<K) links based on a path criticality, where the m links are used as an input for the path selecting stage.

In the path selecting stage, the CNC calculates an optimal transmission path for TT streams between each pair of sender and receiver, based on features of TT streams and non-TT streams, link transmission costs and pheromone updating rules, and determines another effective path as a transmission path for the non-TT stream.

In the gate designing stage, based on the optimal path for the TT stream calculated in the path selecting stage, the CNC performs the fused path selection and gate scheduling algorithm to calculate a gate control list for transmitting the TT streams, and transmits a calculation result to the TSN switch.

The centralized user configuration management system includes the CNC and the CUC. The CNC includes a TSN network topology discovery module, a TSN network configuration module, a TSN network update module, a path selection module, and a gate calculation module. The path selection module and the gate calculation module jointly perform the fused path selection and gate scheduling algorithm. The TSN network topology discovery module generates a network topology of the TSN network. The TSN network configuration module configures data for devices in a TSN domain and stores the configuration data in a database. The TSN network update module updates configuration data of all devices in the TSN domain and records the updating operation in the database. The CNC obtains resource information of the TSN network by using a NETCONF/YANG model and transmits the configuration information. The CUC distributes TSN stream configuration information to terminal devices (senders and receivers) of the TSN network through a user configuration protocol.

The CNC discovers the TSN network topology through a link discovery protocol (LLDP). In order to ensure the real-time transmission requirements of the network, a terminal device sends a TSN network connection request to the CUC through the user configuration protocol. The CUC converts the TSN connection request to a TSN connection requirement and forwards the TSN connection requirement to the centralized network configuration module (CNC) via a user network interface (UNI). For each pair of sender and receiver, the CNC calculates an optimal transmission path for TT streams between the pair of sender to receiver and calculates a transmission path for non-TT streams between the pair of sender to receiver based on the topology information of the TSN network and the connection requirement. To solve the problem of traffic conflicts caused by transmission link overlap in transmitting TT streams, stream transmission constraints are set and a gate control list for the optimal transmission paths of the TT streams is configured. The CNC transmits the scheduling table to the TSN switch through a NETCONF protocol, thereby performing configuration and management on the TSN network.

The fused path selection and gate scheduling algorithm includes the following steps 1 to 8.

In step 1, the CNC discovers a TSN network topology through a link discovery protocol (LLDP), and abstracts a network directed graph from the TSN network topology by using a network modeling algorithm.

In step 2, through the user configuration protocol, the terminal device transmits the number K of the preselected paths, the number m of the preferred paths selected based on the path criticality $\eta_k$, the maximum number $N_{cyc}$ of cycles of the algorithm, the maximum number $N_{ant}$ of ant, the total quantity Q of pheromones, the transmission period of the TSN stream, the size of the TSN stream, and the delay $D_i$ of the TSN stream to the CUC, and the CUC transmits the connection requests to the CNC via the user network interface UNI.

In step 3, in response to a path selection request, the CNC selects K shortest paths as preselected paths based on a fused path selection and gate scheduling algorithm to increase the diversity of path selection samples.

In step 4, the CNC selects m (m<K) preferred paths from the K preselected paths based on a path criticality $\eta_k$.

In step 5, the CNC uses the m preferred paths as an input to the path selecting stage, to determine an optimal transmission path for a TT stream between a pair of sender and receiver based on TSN stream features, link transmission costs and pheromone updating rules, stores the optimal transmission path in a path information table $\omega$, and determines a proper transmission path for a non-TT stream.

In step 6, the CNC performs a traversal process to determine whether there exists a pair of sender and receiver for which the optima transmission path has not yet been calculated. If existing such pair of sender and receiver, the method proceeds to steps 3 to 6, and the CNC stores each calculated optimal path into the path information table $\omega$. If not existing such pair of sender and receiver, the method proceeds to step 7.

In step 7, in the gate designing stage, in order to solve the problem of traffic conflicts caused by transmission link overlap in transmitting the TT streams, the optimal transmission path information table $\omega$ for the TT streams calculated in step 6 is used as an input to the gate designing stage, a stream transmission constraint is configured, and a gate control list is configured for each of the optimal transmission paths of all pairs of senders to receivers, thereby ensuring the reliable transmission of the TT streams.

In step 8, the CNC encapsulates a calculated result in an XML file, configures an XML-based gate scheduling table to a TSN switch through the NETCONF protocol, and transmits a stream transmission calculation result to a TSN terminal device via the CUC.

Figure 2:
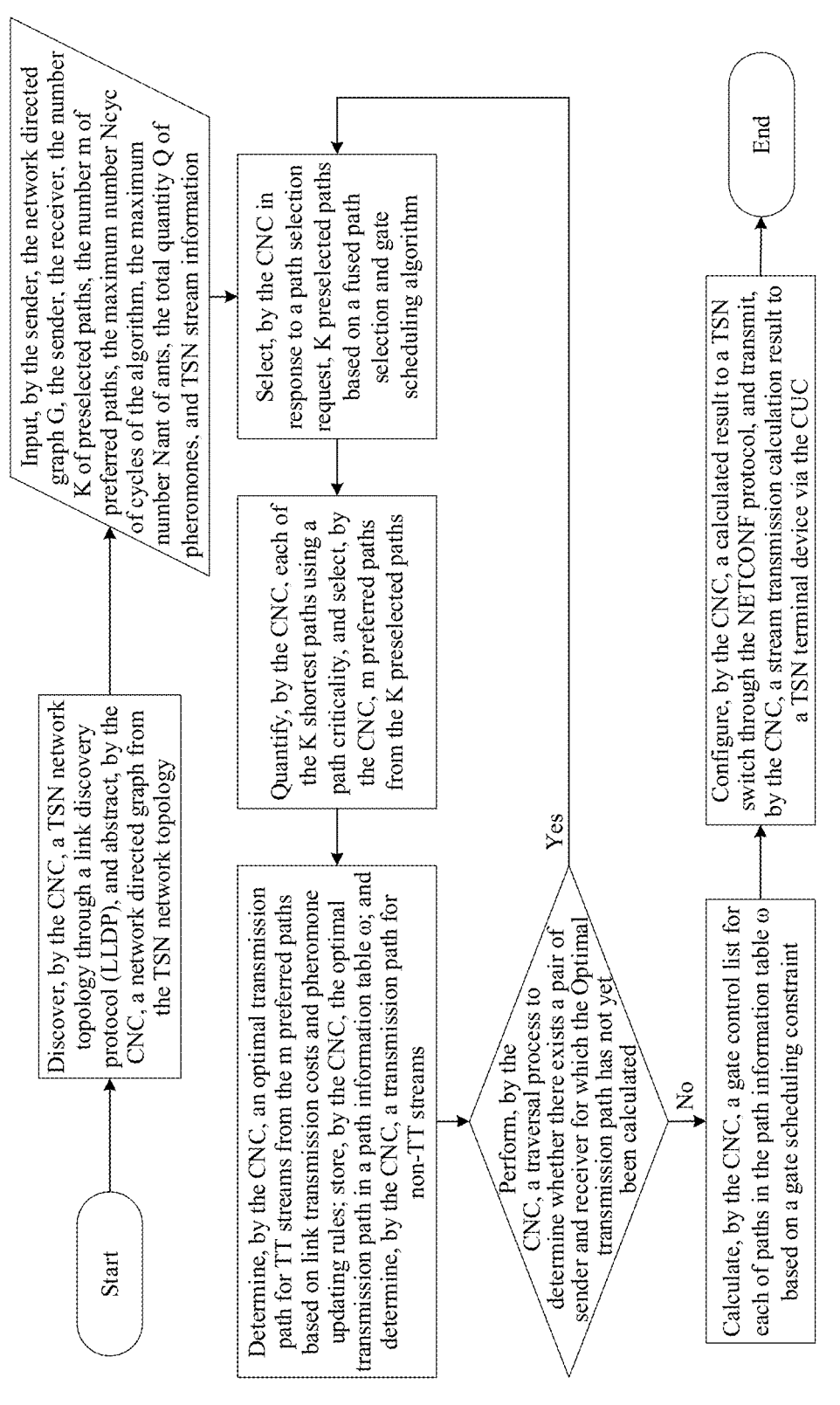
FIG. 2 is a flowchart of a fused path selection and gate scheduling algorithm performed by a CNC.

FIG. 2 shows a flowchart of the algorithm. The fused path selection and gate scheduling algorithm are explained in detail below.

In the network modeling stage, the following steps 1 and 2 are performed.

In step 1, the CNC discovers the TSN network topology through the link discovery protocol (LLDP), and abstracts a network directed graph from the TSN network topology by using a network modeling algorithm.

The purpose of TSN path selection is to determine a suitable transmission path for TSN streams and schedule the transmission of the TT streams with a gate control list (GCL). In this process, the network topology and the TSN traffic model are considered.

The denotations of terms in the method according to the present disclosure are shown in the following Table 1.

TABLE 1

Denotations of terms in TSN topology

| Terms | Denotations |
|---|---|
| node set in TSN network | $V$ |
| a set of m preferred paths (initial path table) selected based on path criticality | $R_{ant}$ |
| edge set (representing all links in the network) | $E$ |
| path criticality | $\eta_k$ |
| TSN switch set | $S$ |
| path information table | $\omega$ |
| terminal device set | $H$ |
| amount of pheromones of link $(BR_i, BR_j)$ | $\tau(BR_i, BR_j)$ |
| TSN switch i | $BR_i \ (i = 1, 2, 3 \dots) \in S$ |
| heuristic factor for node selection | $\mu(BR_i, BR_j)$ |
| sender information heuristic factor | $ES_i \ (ES_i \in H)$ $\alpha$ |
| receiver expected heuristic factor | $ES_i' \ (ES_i' \in H)$ $\beta$ |
| TSN stream | $F_i$ |
| volatility coefficient of pheromones | $\rho$, where $0 < p < 1$ |
| TT stream | $f_i(f_i \in F_i)$ |
| increment of pheromones of link $(BR[_i, BR_j)$ | $\Delta\tau(BR[_i, BR_j)$ |
| non-TT stream | $f_i'(f_i' \in F_i)$ |
| total quantity of pheromones | $Q$ |
| end-to-end delay of TSN stream | $D_i$ |
| path selection coefficient | $\varsigma(BR_i, BR_j)$ |
| size of TSN stream | $S_i$ |
| number of transmission paths for non-TT streams | $N_{non\text{-}TT\ stream}$ |
| transmission period of TSN stream | $T_i$ |
| ant taboo list | $R_b$ |

TABLE 1-continued

Denotations of terms in TSN topology

| Terms | Denotations |
|---|---|
| set of all paths from sender to receiver | $P_{sd}$ |
| maximum number of cycles of algorithm | $N_{cyc}$ |
| link between switch $BR_i$ and switch $BR_j$ | $(BR_i, BR_j)$ where $BR_i, BR_j \in V, BR_i \neq BR_j$ |
| optimal path set obtained using an ant colony algorithm | $R = \left\{ \begin{array}{l} path_1, path_2, \\ path_3, \dots, path_N \end{array} \right\}$ |
| transmission path of TSN stream | $R_i$ |
| maximum number of ants | $N_{ant}$ |
| number of cycles of algorithm | $n_{cyc}$ |
| number of ants remaining | $n_{ant}$ |
| bandwidth of link $(BR_i, BR_j)$ | $b_{BR_i, BR_j}$ |
| transmission cost | $TV$ |
| delay of link $(BR_i, BR_j)$ | $ld_{BR_i, BR_j}$ |
| path set storing path traveled by ants | $R_{te}$ |
| processing delay of $BR_i$ | $d_{BR_i}^{proc}$ |
| optimal path for TT streams from sender $ES_i$ to receiver $ES_i'$ | $R_{TT\ stream}^i$ |
| transmission delay of $BR_i$ | $d_{BR_i}^{proc}$ |
| optimal path for TT streams | $R_{TT\ stream} = \left\{ \begin{array}{l} ES_i, BR_a, \\ BR_b, \dots, BR_n, ES_i' \end{array} \right\}$ |
| propagation delay of $(BR_i, BR_j)$ | $d_{BR_i, BR_j}^{prop}$ |
| cycle of gate control list | $GC$ |
| set of K shortest paths | $P_k$ |
| length pf time slot | $LOS$ |
| set of paths between $ES_i$ to $ES_i'$ | $P_{sd}$ |
| GCL cycle start time of switch $BR_n$ | $\phi_{BR_n}$ |
| shortest path length of transmission queue | $P^s$ $LOG$ |
| number of hops of path $P_k$ | $p_k$. $HC(HC \in \mathbb{Z}^+)$ |
| transmission speed of link $(BR_i, BR_j)$ | $C_{BR_i, BR_j}$ |

TABLE 1-continued      TABLE 1-continued

| Denotations of terms in TSN topology | |
| --- | --- |
| Terms | Denotations |
| remaining bandwidth of path $P_k$ | $p_k$, SBW(SBW ∈ ℝ⁺, (in Mbps) |
| delay between one switch to another switch | D |
| end-to-end delay of path $P_k$ | $P_k$, DL(DL ∈ ℝ⁺, (in microseconds) |
| delay of switch $BR_i$ | $d_{BR_i}$ |
| time instant for sending stream $f_i$ | $r_{f_i}$ |
| transmission offset of stream $f_i$ on $(BR_i, BR_j)$ | $\chi_{f_i, BR_i, BR_j}$ |
| time instant for sending a first data frame by sender | $r_{f_i}^F$ |
| maximum difference in time synchronization between two node devices | synPre |
| time period for transmitting a data frame of stream $f_i$ on link $(BR_i, BR_j)$ | $L_{f_i, BR_i, BR_j}$ |
| payload of a link | $p_i$ |
| a first frame of stream $f_i$ on link $(BR_i, BR_j)$ ∈ E | $F_{f_i, BR_i, BR_j}$ |
| maximum time period in which a receiver receives data | $\tilde{d}_{f_i}$ |
| ID of queue storing $F_{f_i, a, b}$ | $\lambda_{f_i, BR_i, BR_j}$ |
| set of all streams on link $(BR_i, BRj)$ | $F_{BR_i, BR_j}$ |
| GCL cycle start time instant of switch $BR_i$ | $\phi_{BR_i}$ |
| auxiliary variable | $\overline{\omega}$ |
| a Γ-th frame of stream $f_i$ | Γ |
| ξ_th frame of stream $f_i$ | ξ |
| time instant for transmitting a (Γ + 1) th frame of stream $f_i$ on link $(BR_a, BR_b)$ | $o_{f_i, a}$ |
| time instant for storing a (Γ + 1) th frame of stream $f_i$ transmitted on link $(BR_y, BR_a)$ in a queue of switch $BR_a$ | $h_{f_i, x}$ |

| Denotations of terms in TSN topology | |
| --- | --- |
| Terms | Denotations |
| time instant for storing a (ξ + 1)th frame of stream $f_i$ transmitted on link $(BR_y, BR_a)$ in a queue of switch $BR_a$ | $h_{f_i, y}$ |
| time instant for transmitting a (ξ + 1) th frame of stream $f_i$ on link $(BR_a, BR_b)$ | $o_{f_i, a}$ |
| a first link of a transmission path | $(ES_i, BR_j)$ |
| a last link of a transmission path | $(BR_i, ES_i')$ |
| candidate path list | U |
| preselected path list | L |
| number of preselected paths | K |
| number of preferred paths | m |
| link discovery protocol | LLDP |
| maximum SBW of all paths $p_k$ ∈ $P_{sd}$ | $SBW_{max}$ |
| minimum H of all $p_k$ ∈ $P_{sd}$ | $H_{min}$ |
| minimum DL of all paths $P_k$ ∈ $P_{sd}$ | $DL_{min}$ |
| length of a shortest path $P^s$ | $c(P^s)$ |
| length of other path P (P ∈ $P_{sd}$, p ≠ $P^s$) | $c(P)$ |

The TSN network topology is represented as a directed graph of G=(V, E), where V represents a node set, E represents an edge set. V≡(S∪H), where S represents a TSN switch set, and H represents a terminal device set. E is a set of binary tuples, and represents links in the network. E≡{ $(BR_i,BR_j)|BR_i,BR_j$∈V, $BR_i$≠$BR_j$, and $BR_i$ is related with $BR_j$}.

Each of links $(BR_i,BR_j)$∈E is associated with a measurement value list that is represented by a tuples (b, ld), where b∈ℝ⁺ (in Mbps), and represents a remaining bandwidth of the $(BR_i,BR_j)$, ld∈ℝ⁺ (in microseconds), represents a link delay, and includes $d_{BR_i}^{proc}$, $d_{BR_i}^{prop}$ and $d_{BR_i,BR_j}^{prop}$. It should be noted that $ld_{BR_i, BR_j}$ is bounded.

According to the present disclosure, an ordered data sequence transmitted from the sender to the receiver according to a requirements is referred as a stream, and a set of all the TSN streams is represented as F. For different types of streams, main parameters include: $R_i$, $D_i$, $T_i$ and $S_i$. Each of the TSN streams $F_i$ is represented as a quadruple $F_i$=($R_i$, $D_i$, $T_i$, $S_i$).

A stream flows from a sender $ES_i$ to a receiver $ES^{i'}$, passing through n nodes $BR_1$, $BR_2$, . . . , $BR_n$. A path of an i-th pair of sender and receiver may be represented as $R_i$={$ES_i$, $BR_1$, $BR_2$, . . . , $BR_n$, $ES'_i$}. The size $S_i$ of the stream is in the unit of bytes. A maximum length of frame is a MTU (maximum transmission unit) of an Ethernet.

In step 2, the terminal device, through the user configuration protocol, transmits the number K of the preselected paths, the number m of the preferred paths selected based on the path criticality $\eta_k$, the maximum number $N_{cyc}$ of cycles of the algorithm, the maximum number $N_{ant}$ of ant, the total quantity Q of pheromones, the transmission period $T_i$ of the TSN stream, the size $S_i$ of the TSN stream, and the delay $D_i$ of the TSN stream to the CUC, and the CUC transmits the connection requests to the CNC via the user network interface UNI.

In the path preselecting stage, the following steps 3 and 4 are performed.

In step 3, in response to a path selection request, the CNC selects K shortest paths as preselected paths based on a fused path selection and gate scheduling algorithm to increase the diversity of path selection samples.

In this stage, K preselected paths $P_k$ between $ES_i$ and $ES'_i$ are calculated using the fused path selection and gate scheduling algorithm. For each pair of $ES_i$, $ES'_i \in$ H, the K candidate paths $P_k$ may be obtained by sorting shortest paths in an ascending order by using a K-shortest path (KSP) algorithm. For determining these paths, the network directed graph G, the sender $ES_i$, the receiver $ES'_i$, and the number K of the paths are used as inputs, and a set $p_K$ of the K paths is outputted. Then, the set $p_K$ of the K paths is used as an input for the following step 4.

The set of paths from $ES_i$ to $ES'_i$ is represented by $P_{sd}$. The shortest path is determined as a path $P^s$ with a shortest length from $ES_i$ to $ES'_i$ in the directed graph G, that is, $P^s \in P_{sd}$ and any other path P ($P \in P_{sd}$, $p \neq P^s$) meets $c(P^s) \leq c(P)$. By the KSP algorithm, not only the shortest path, but also a second shortest path, a third shortest path, . . . , and a K-th shortest path are determined. Using $p_i$ represents the i-th shortest path from $ES_i$ to $ES'_i$, the KSP algorithm is to determine a path set $P_K$={$p_1$, $p_2$, . . . , $p_K$}$\in P_{sd}$ that meeting the following four conditions:

(1) K paths are generated in order, that is, for i(i=1, 2, . . . , K−1), $p_i$ is determined before $p_{i+1}$;

(2) the K paths are sorted in ascending order of length, that is, for i(i=1,2, . . . , K−1), $c(p_i) < c(p_{i+1})$;

(3) the K paths are the shortest paths, that is, for $p \in P_{sd} - P_k$, $c(p_k) < c(p)$; and (4) all the K paths are acyclic.

Figure 3:
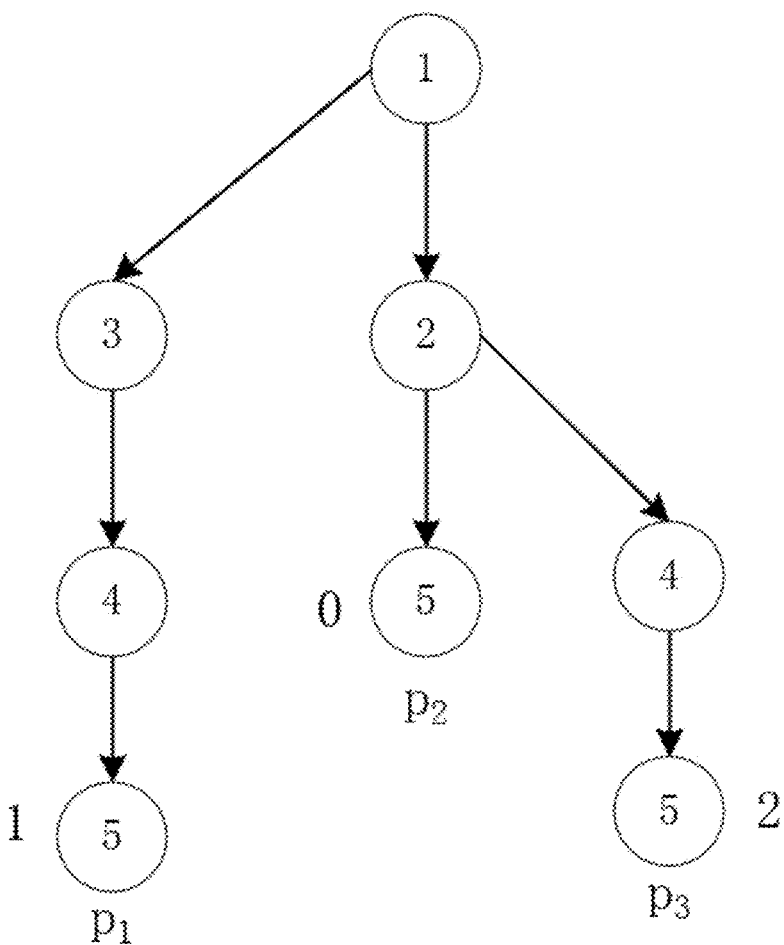
FIG. 3 is a schematic diagram showing a shortest path tree.

A shortest path tree $T_k$ is constructed based on deviation paths, which is an important concept. Assuming that two paths $p_i$=($v_1$, $v_2$, . . . , $v_l$) and $p_j$=($u_1$, $u_2$, . . . , $u_w$) Exist Between $ES_i$ and $ES'_i$, if an integer x meets the following four conditions: (1) x<1, and x<w, (2) $v_i$=$u_i$(0≤i≤x), (3) $v_{x+1} \neq u_{x+1}$ and (4) ($u_{x+1}$, $u_{x+2}$, . . . , $u_w$=t) is a shortest path from $u_{x+1}$ to t, then ($u_x$, $u_{x+1}$) is a deviation edge of $p_j$ relative to $p_i$, $u_x$ is a deviation node of $p_j$ relative to $p_i$, the path ($u_{x+1}$, $u_{x+2}$, . . . , $u_w$=t) is the shortest deviation path of $p_j$ relative to $p_i$. As shown in FIG. 3, the deviation node of $p_2$ relative to $p_1$ is node 1, the deviation edge of $p_2$ relative to $p_1$ is edge (1,3), and the deviation path of $p_2$ relative to $p_1$ is (1,3,4,5).

Figure 4:
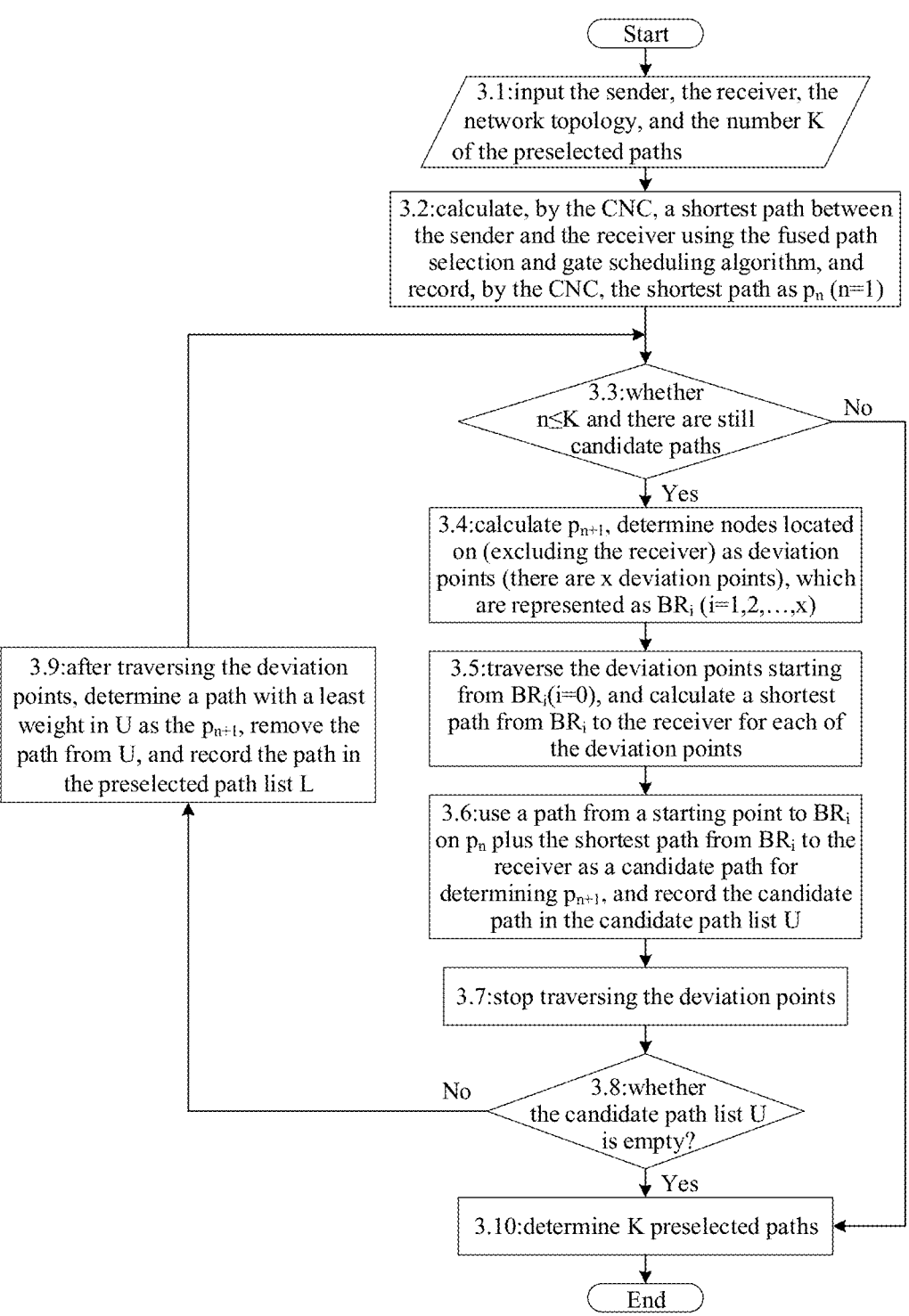
FIG. 4 is a flowchart of a shortest path algorithm.

In the path preselecting stage, the network directed graph G, the sender $ES_i$, the receiver $ES'_i$, and the number K of the paths to the network are inputted, and a set $P_K$={$p_1$, $p_2$, . . . , $p_n$}$\in P_{sd}$(1≤n≤K) of the K paths is outputted. In the present disclosure, the link delay $ld_{BR_i, BR_j}$ serves as a weight. A weight of a path is equal to a sum of delays of all links of the path. As shown in FIG. 4, the following steps 3.1 to 3.10 are performed.

In step 3.1, the network directed graph G, the sender $ES_i$, the receiver $ES'_i$, and the number K of the preselected paths are inputted.

In step 3.2, the CNC calculates a shortest path between $ES_i$ and $ES'_i$ using the fused path selection and gate scheduling algorithm, and records the shortest path as:

$$p_n(n=1):p_n=ES_i \rightarrow BR_a \rightarrow BR_b \rightarrow \ldots \rightarrow BR_n \rightarrow ES'_i$$

In step 3.3, it is determined whether n is less than or equal to K and whether there are still candidate paths. In a case that n is less than or equal to K and there are still candidate paths, the process proceeds to step 3.4. In a case that n is greater than K or there is no candidate path, it indicates that the K preselected paths are determined.

In step 3.4, with the calculated $p_n$, $p_{n+1}$ is calculated based on deviation points and a Dijkstra algorithm. Nodes located on $p_n$ (excluding the receiver $ES'_i$) are determined as deviation points (it is assumed that there are x deviation points). The deviation points are represented by $BR_i$(i=1,2, . . . , x).

In step 3.5, the deviation points are traversed. The deviation points are traversed starting from $BR_i$(i=0), and a shortest path from $BR_i$ to the receiver $ES'_i$ is calculated for each of the deviation points.

In step 3.6, a path from a starting point to $BR_i$ on $p_n$ plus the shortest path from $BR_i$ to the receiver $ES'_i$ is used as a candidate path for determining $p_{n+1}$, and the candidate path is recorded in a candidate path list U:

TABLE 2

| Candidate path list U and Preselected path list L | |
| --- | --- |
| Preselected path list L | Candidate path list U |
| $p_1$ | $ES_i \rightarrow BR_a \rightarrow \ldots \rightarrow$ BRe $\rightarrow ES_i'$ |
| $p_2$ | $ES_i \rightarrow BR_b \rightarrow \ldots \rightarrow$ BRf $\rightarrow ES_i'$ |
| . . . | . . . |
| $p_n$ | $ES_i \rightarrow BR_c \rightarrow \ldots \rightarrow$ BRg $\rightarrow ES_i'$ |

In step 3.7, traversing of the deviation points is stopped.

In step 3.8, it is determined whether the candidate path list U is empty.

In step 3.9, in a case that the candidate path list U is not empty, a path with a least weight in B is determined as $p_{n+1}$ after traversing all the deviation points, the path is removed from U, and is recorded in the preselected path list L. After determining the $p_{n+1}$, if n+1≤K, the steps 3.3 to 3.8 are repeated, and if n+1>K, it indicates that K preselected paths are determined.

In step 3.10, in a case that the candidate path list U is empty, it is indicated that the K preselected paths are determined, and the set of the paths is determined as $P_k$={$p_1$, $p_2$, . . . , $p_n$, $p_k$}$\in P_{sd}$.

In step 4, the CNC selects m (m<K) preferred paths from the K preselected paths based on a path criticality $\eta_k$.

To reduce the cost for performing the algorithm and improve the operation efficiency of the network, each of paths in the path table is quantified using a path criticality $\eta_k$. In this stage, the set $P_k$ of the K preselected paths is inputted, and a set $R_{ant}$ of m (m<K) preferred paths are outputted.

Each path $p_k$ has a path criticality index Δ(HC,SBW,DL). In the following description, "A.B" represents "B of A", and the number of hops HC of the path $p_k$ (represented by $p_k$. HC) is equal to the number of TSN switches. $p_k$. HC is equal to the number of TSN switches on the path $p_k$ excluding the sender and the receiver, and is expressed as:

$$p_k.HC = \text{len}(p_k) - 2 \qquad (1)$$

A remaining bandwidth SBW of the path $p_k$ (represented by $p_k$· SBW) is equal to a minimum remaining bandwidth of all links included in the path $p_k$. For the convenience of description, it is assumed that $p_k=\{ES_i, BR_1, BR_2, \ldots, BR_n, ES'_i\}$ and $S=len(p_k)-2$, the remaining bandwidth SBW of the path $p_k$ may be expressed as:

$$p_k \cdot SBW = \begin{cases} \min\left(b_{ES_i,BR_S}, b_{BR_S,ES'_i}\right) & S = 1 \quad (2) \\ \min\left(b_{ES_i,BR_1}, b_{BR_S,ES'_i}, b_{BR_1,BR_2}\right) & S = 2 \\ \min\left(\min_{i=1}^{S-1} b_{BR_i,BR_{i+1}}, b_{ES_i,BR_1}, b_{BR_S,ES'_i}\right) & S \geq 3 \end{cases}$$

An end-to-end delay DL of the path $p_k$ (represented by $p_k$· DL) is equal to a sum of delays $ld_{BR_i,BR_{i+1}}$ of the links included in the path $p_k$, and may be expressed as:

$$p_k \cdot DL = \begin{cases} ld_{ES_i,BR_S} + ld_{BR_S,ES'_i} & S = 1 \quad (3) \\ \sum_{i=1}^{S-1} ld_{BR_i,BR_{i+1}} + ld_{ES_i,BR_1} + ld_{BR_S,ES'_i} & S \geq 2 \end{cases}$$

A function $\Delta(HC,SBW,DL)$ is used to map a path criticality $\eta_k$ of the path $p_k$ (represented by $p_k$· $\Delta(HC,SBW,DL)$) to a value ranging from 0 to 1. A path with a maximum $\eta_k$ is selected from the set $p_k$ of the preselected paths as an input to the path selecting stage. For the path $p_k \in P_{sd}$, $\eta_k$ is expressed as:

$$\eta_k = p_k \cdot \Delta(HC, SBW, DL) = \omega_1 \frac{HC_{min}}{HC} + \omega_2 \frac{SBW}{SBW_{max}} + \omega_3 \frac{DL_{min}}{DL} \quad (4)$$

$$\omega_1 + \omega_2 + \omega_3 = 1 \quad (5)$$

where $\Sigma_{j=1}^{3}\omega_j=1$, $SBW_{max}$ represents a maximum SBW of all paths $p_k \in P_{sd}$, $HC_{min}$ represents a minimum HC of all the paths $p_k \in P_{sd}$, $DL_{min}$ represents a minimum DL of all of the paths $p_k \in P_{sd}$. A greater $\eta_k$ indicates a smaller number of hops in the network, a greater remaining bandwidth and a less network delay. In the present disclosure, after comprehensively considering the number of hops and the remaining bandwidth of the path, it is set that $\omega_1=0.3$, $\omega_2=0.3$, and $\omega_3=0.4$.

A path criticality $\eta_k$ of each of the path $p_k$ is calculated by performing the above operations, top m paths with largest $\eta_k$ are determined as the preferred paths and are recorded in a preferred path set $R_{ant}$.

In the path selecting stage, the following steps 5 and 6 are performed.

In step 5, the CNC uses the m preferred paths as an input to the path selecting stage, determines an optimal transmission path for TT streams between a pair of sender and receiver based on TSN stream features, link transmission costs and pheromone updating rules, stores the optimal transmission path in a path information table $\omega$, and determines a transmission path for non-TT streams.

In the fused path selection and gate scheduling algorithm, path selection is performed based on an ant colony algorithm. The ant colony algorithm (ACO) is a population intelligence algorithm in which a group of non-intelligent or slightly intelligent individuals (agents) collaborate with each other to exhibit an intelligent behavior, thereby providing a possibility for solving complex problems.

A transmission probability of an ant "a" from a node $BR_i$ to a node $BR_j$ is calculated by using the following equations:

$$P(BR_i, BR_j) = \quad (6)$$

$$\begin{cases} \dfrac{\tau(BR_i, BR_j)^\alpha \times \mu(BR_i, BR_j)^\beta}{\sum_{BR_Q \in allow_a} \tau(BR_i, BR_Q)^\alpha \times \mu(BR_i, BR_Q)^\beta}, & BR_j \in allow_a \\ 0, & BR_j \notin allow_a \end{cases}$$

$$\mu(BR_i, BR_j) = \delta \times b_{BR_i,BR_j} + \frac{\varepsilon}{ld_{BR_i,BR_j}} \quad (7)$$

where $allow_a$ represents a set of links from a node to a next node; a greater a indicates a stronger guiding role of the pheromones; a greater $\beta$ indicates a greater influence of path distance information on the ant making a decision and the more greedy on a current effect; $\delta$ and $\varepsilon$ represents weight factors, $\delta+\varepsilon=1$, $0<\delta<1$, $0<\varepsilon<1$, $\delta$ and $\varepsilon$ are determined based on the current type of stream; and in a case of TT streams, due to the sensitivity of the TT streams to delay, $\delta$ is set less than $\varepsilon$. For example, $\delta=0.3$ and $\varepsilon=0.7$.

After the ant performs the first path search, the pheromones are updated based on the following equation:

$$\tau(BR_i, BR_j) = \quad (8)$$

$$\begin{cases} (1-\rho) \times \tau(BR_i, BR_j) + \Delta\tau(BR_i, BR_j) & (BR_i, BR_j) \in R_{ant} \\ (1-\rho) \times \tau(BR_i, BR_j) & (BR_i, BR_j) \notin R_{ant} \end{cases}$$

$\Delta\tau(BR_i,BR_j)$ is determined based on the type of the TSN data stream, and is expressed as:

$$\Delta\tau(BR_i, BR_j) = \quad (9)$$

$$\begin{cases} \dfrac{Q}{\sum_{i=1}^{n} \sum_{j=1}^{n} \left[ld_{(BR_i,BR_j)} \times \varsigma(BR_i, BR_j)\right]} & TT \text{ stream} \\ \dfrac{Q}{\min\left(b_{(BR_i,BR_j)} \times \varsigma(BR_i, BR_j)\right)} & non\text{-}TT \text{ stream} \end{cases}$$

$\varsigma(BR_i,BR_j)$ is expressed as:

$$\varsigma(BR_i, BR_j) = \begin{cases} 1 & (BR_i, BR_j) \in R_{ant} \\ 0 & (BR_i, BR_j) \notin R_{ant} \end{cases} \quad (10)$$

Based on the expressions of $\Delta\tau(BR_i,BR_j)$, it can be seen that in the present disclosure, the pheromones are classified and updated based on the end-to-end delay of the TT streams and the bandwidth requirements of the non-TT streams, thereby ensuring that the optimal paths for the TT streams and the non-TT streams meet respective requirements, and thus improving network utilization.

It is assumed that a path set $R=\{path_1, path_2, path_3, \ldots, path_N\}$ is obtained after performing the fused path selection and gate scheduling algorithm. In a case of TT streams, a path with a least delay is selected from R as an optimal path for transmitting TT streams. In a case of non-TT streams, a path with a large remaining bandwidth is selected from R for transmitting the non-TT streams, where $1<N_{non\text{-}TT\ stream}<N$.

According to the present disclosure, link transmission costs and pheromone updating rules in the fused path selection and gate scheduling algorithm are configured based on the type of the TSN stream, and then optimal transmission paths for the TT streams and the non-TT streams are calculated, thereby reducing packet loss rate and improving network utilization. In the algorithm, $R_{ant}$, $R_b$, $N_{cyc}$, $N_{ant}$ and Q are inputted, and transmission paths for the $R_{TTstream}$ and the non-TT stream $f_i'$ are outputted. The algorithm includes the following steps 5.1 to 5.9.

In step 5.1, initialization parameters are configured, and an initial path table $R_{ant}$ for the fused path selection and gate scheduling algorithm is outputted from the path preselecting stage. An ant taboo table $R_b$, the maximum number $N_{cyc}$ of cycles of the algorithm, the maximum number $N_{ant}$ of ant, and the total quantity Q of pheromones are configured.

In step 5.2, the type of the stream is determined, and impact factors $\alpha$ and $\beta$, link weight factor $\delta$ and $\epsilon$, pheromone volatility coefficient $\rho$, and pheromone increment $\Delta\tau$ are configured for the TT streams and the non-TT streams. An ant is placed at the sender, and the sender is recorded in $R_b$.

In step 5.3, the number of cycles is updated by $n_{cyc}=n_{cyc}+1$.

In step 5.4, the number of the ant is updated by $n_{ant}=n_{ant}+1$.

In step 5.5, the ant selects a next node using the equation (6).

In step 5.6, it is determined whether the ant reaches the receiver. In a case that the ant does not reach the receiver, the process proceeds to step 5.5. In a case that the ant reaches the receiver, a path traveled by the ant is recorded in a path table $R_{te}$, nodes of the path are recorded in the taboo table $R_b$ to avoid crossing with a path of another ant, and the process proceeds to step 5.7.

In step 5.7, it is determined whether $n_{ant}$ is equal to $N_{ant}$. In a case that $n_{ant}<N_{ant}$, the process proceeds to step 5.4. In a case that $n_{ant}=N_{ant}$, a path having a lowest transmission cost TV is selected from $R_{te}$ as an optimal path in this cycle, the path is recorded in a best path set R, and the process proceeds to step 5.8.

In step 5.8, it is determined whether $n_{cyc}$ is equal to $N_{cyc}$. In a case that $n_{cyc}\neq N_{cyc}$, the process proceeds to step 5.3, the pheromones in the link is updated based on the equation (8), and $R_b$ is cleared. In a case that $n_{cyc}=N_{cyc}$, the process proceeds to step 5.9.

In step 5.9, an optimal transmission path for the TT streams and an optimal transmission path for the non-TT streams are outputted. In a case of the TT streams $f_i$, a path with a minimum delay is selected from the path set R as the optimal path which is represented as $R_{TT\,stream}^i$; and in a case of the non-TT streams $f_i'$, $N_{non-TT\,stream}$ paths are selected from the path set R as optimal paths and are forwarded.

In step 6, the CNC determines whether there still exist a pair of sender and receiver for which the optimal paths have not yet been calculated. In case of still existing such pair of sender and receiver, the process proceeds to steps 3 to 6, and the CNC stores each calculated optimal paths of TT streams for each pair of sender and receiver into the path information table $\omega$. In a case not existing such pair of sender and receiver, the process proceeds to step 7.

The method according to the present disclosure is applied to a multi-input and multi-output network, and thus the path selection should be performed for each pair of sender and receiver in the TSN. The subsequent gate scheduling mechanism is performed only for the TT streams, so that the optimal path is obtained only for the TT streams. Steps 3 to 6 are repeated to calculate an optimal path for each pair of receiver and sender, and all the calculated optimal paths are stored in the path information table $\omega$. In the gate designing phase, for each of the optimal paths for TT streams in the path information table $\omega$, a gate control list is calculated for scheduling. The following Table 3 shows a calculation results in the path selecting stage.

TABLE 3

Path information table $\omega$ for each pair of terminal devices

| | Number of paths | | |
|---|---|---|---|
| Terminal devices | Path preselecting stage | Path selecting stage | Path information table $\omega$ |
| $[ES_1, ES_1']$ | m | 1 | $R_{TTstream}^1$ |
| $[ES_2, ES_2']$ | m | 1 | $R_{TTstream}^2$ |
| $[ES_3, ES_3']$ | m | 1 | $R_{TTstream}^3$ |
| . . . | . . . | . . . | . . . |
| $[ES_i, ES_i']$ | m | 1 | $R_{TT\,stream}^i$ |

In the gate designing stage, the following steps 7 and 8 are performed.

In the IEEE 802.1Qbv standard, a gating mechanism called time aware shaper (TAS) is defined based on a statically generated periodic plan called a gate control list, which is used to enable or disable connection of a queue to an associated exit port. The communications in the network are performed by regularly sending data streams from senders to receivers. The communication paths to be used in this stage are calculated in the path selecting stage. TT streams are most delay sensitive TSN streams. According to the present disclosure, to avoid the problem of traffic conflicts caused by overlapping transmission links in transmitting the TT streams, periodic GCL scheduling for the TT streams is performed based on the ending time, the stream transmission constraints and the optimal transmission path information table $\omega$ of the TT streams, thereby reducing the delay impact caused by traffic conflicts.

A link of $(BR_i,BR_j)\in E$ represents a direction of communication, and a pair of links $(BR_i,BR_j)$, $(BR_j, BR_j)\in E$ represents a full duplex physical link between nodes $BR_i$ and $BR_j$. From a scheduling perspective, the two links are two different resources. It is assumed that all devices in the network are time synchronized. A synchronization error in a worst case, that is a maximum difference between local clocks of two devices in the network, is represented by synPre. The TSN streams may have different time periods, and the time periods of all data streams are represented by T, $T=\{f_0, T_0, f_1.T_1, \ldots, f_n, T_n\}$, where $f_n.T_n$ represents a time period $T_n$ of a stream $f_n$. A cyclic period GC of the gate control list is equal to a least common multiple (lcm) of all the time periods of the streams, and may be expressed as:

$$GC = lcm(T) \tag{11}$$

Therefore, a TT stream of the TSN may appear multiple times in a cyclic period of the gate control list.

In the present disclosure, transmission paths of streams are searched and computed using the fused path selection and gate scheduling algorithm. With the algorithm, an optimal path for transmitting the TT streams is calculated. In this part, scheduling of TT streams is described. In a case that a stream $f_i$ flows through the link $(BR_i, BR_j)$, $f_i \in F_{BR_i, BR_j}$ where $F_{BR_i, BR_j}$ may be an empty set.

It is assumed that zero jitter (strict periodic scheduling) is required, that is, a time distance between subsequent frames of a stream $f_i \in F$ is always equal to $T_i$. Integer variables $X_{f_i, BR_i, BR_j} \in E$, $f_i \in F_{BR_i, BR_j}$, and $\lambda_{f_i, BR_i, BR_j}$, $(BR_i, BR_j) \in E$, $f_i \in F_{BR_i, BR_j}$, $L_{f_i, BR_i, BR_j}$ may be calculated by using the following equation (12):

$$L_{f_i, BR_i, BR_j} = \frac{8 \cdot p_i}{C_{BR_i, BR_j}} \tag{12}$$

In step 7, in the gate designing stage, to avoid the problem of traffic conflicts caused by overlapping transmission links in transmitting TT streams, the optimal transmission path information table ω for the TT streams obtained in the step 6 is used as an input to the gate designing stage, a stream transmission constraint is configured, and a gate control list is configured for each of the optimal transmission paths of all pairs of senders to receivers, thereby ensuring reliable transmission of the TT streams.

In the time-sensitive networking, for timely and accurate transmission of time sensitive streams, it is required to add constraints to the transmission in the network. In the present disclosure, researching works mainly focus on how to obtain feasible solutions that meets the constraints, and how to determine an optimal solution using an algorithm tool.

Based on a GCL transmission rule, a length of a slot (LOS) is analyzed. Data is offset by the unit of time slot. It is assumed that LOS can be divided exactly by any one of the time periods of all data streams. A maximum length of the slot is obtained by using the following equation (13):

$$MAX(LOS) = GCD(T) \tag{13}$$

That is, the maximum LOS is equal to a greatest common divisor of the time periods of the data streams. According to a TSN standard, a time slot for sending a message at a node is same as a time slot for receiving the message at an adjacent node. Thus, for the length of the time slot, it is required to ensure that the last message in a queue is sent at a node and received at an adjacent node at the same time slot. Therefore, a minimum length of the slot may be obtained by using the following equation (14):

$$\min(LOS) = \frac{LOG}{C_{BR_i, BR_j}} + d_{BR_i}^{proc} + d_{BR_i}^{prop} + synPre \tag{14}$$

where LOG represents a length of a transmission queue, $$\frac{LOG}{C_{BR_i, BR_j}}$$

represents a time length for transmitting the last 1 byte to the link in a case that all queue resources are occupied, for example, synPre=0.1 μs.

It is assumed that a transmission path is expressed as $\{ES_i, BR_1, BR_2, \ldots, BR_n, ES'_i\}$, then $\phi_{BR_n}$ may be calculated by using the following equation (15):

$$\phi_{BR_n} = r_{f_i}F + L_{f_i, ES_i, BR_1} + \sum_{i=1}^{n} d_{BR_i}^{proc} + \tag{15}$$

$$\sum_{i=1}^{n} d_{BR_i}^{prop} + \sum_{j=2}^{n} L_{f_i, BR_{j-1}, BR_j} + synPre$$

Figure 5:
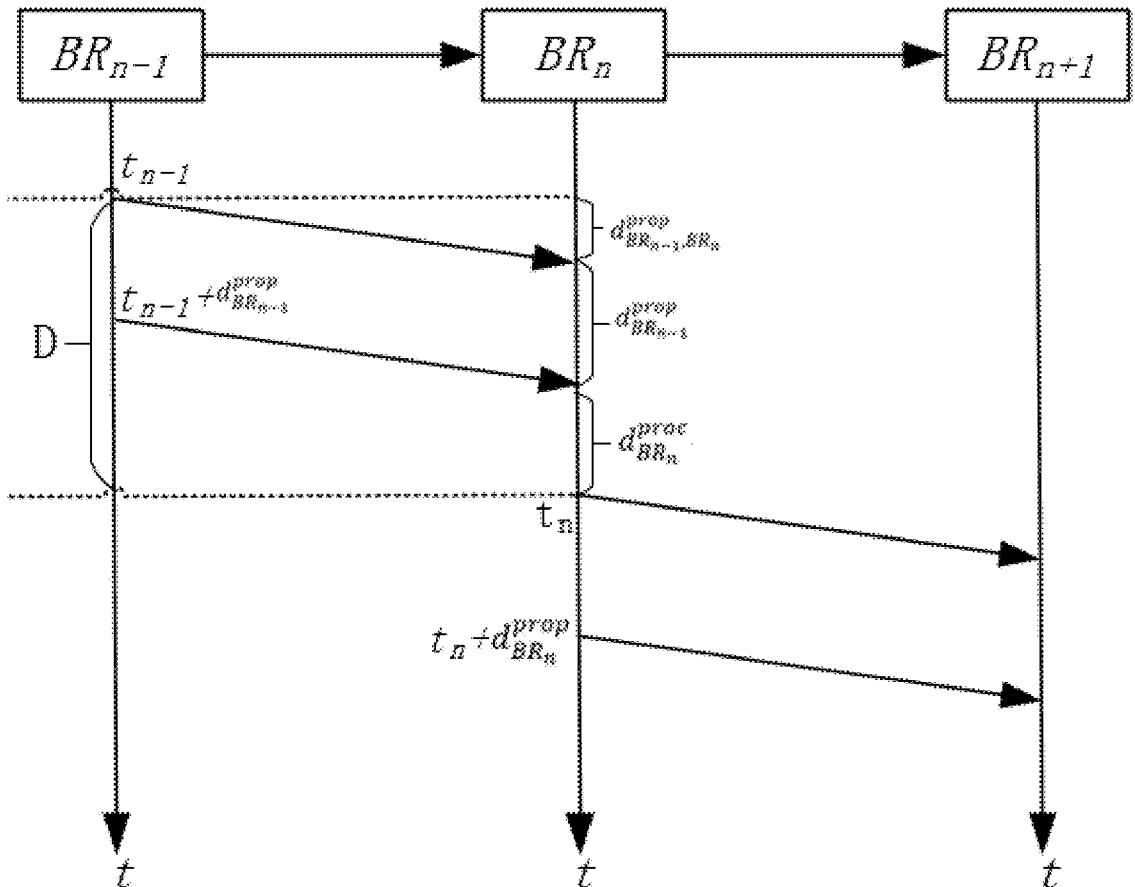
FIG. 5 is a schematic diagram of time delay analysis.

The TT streams are transmitted along the calculated optimal path from the sender to the receiver, and the end-to-end delay of the TT streams includes: a propagation delay, a processing delay, and a transmission delay. The delay analysis is shown in FIG. 5, in which $t_n$ represents a time instant for sending the TT streams at the switch $BR_i$, and D is expressed as:

$$D = d_{BR_n}^{proc} + d_{BR_{n-1}}^{prop} + d_{BR_{n-1}, BR_n}^{prop} \tag{16}$$

The end-to-end delay constraint is that an end-to-end delay of the stream $f_i$ flowing through j switches from the sender to the receiver should be less than or equal to $D_i$. In a case that $(ES_i, BR_j)$ and $(BR_j, ES'_i)$ respectively represent a first link and the last link in the transmission path of the stream $f_i$, the end-to-end delay constraint may be expressed as:

$$\left( d_{ES_i, BR_j}^{prop} + d_{BR_j, ES'_i}^{prop} \right) + \sum_{i=1}^{j-1} d_{BR_i, BR_{i+1}}^{prop} + \sum_{i=1}^{j} d_{BR_i}^{proc} \leq D_i \tag{17}$$

A frame constraint is that a frame should not be transmitted on the first link of the transmission path before a transmission time instant, and should be transmitted through the last link before an ending time.

$$\forall f_i \in F_i : \chi_{f_i, ES_i, BR_j} \geq r_{f_i} \tag{18}$$

$$\forall f_i \in F_i : \chi_{f_i, BR_t, ES'_i} \geq \tilde{d}_i - L_{f_i, BR_t, ES'_i} - ld_{BR_t, ES'_i} \tag{19}$$

A link constraint is that transmissions of two different frames on a link should not overlap in time. That is, for different frames on a same link, one frame should be completely transmitted before beginning to transmit another frame. This constraint should be considered for all frames in a cyclic period GC. Due to the requirement of zero jitter, a transmission offset of a k-th frame of the stream $f_i$ on the link $(BR_i, BR_j) \in E$ is equal to $X_{f_i, BR_i, BR_j} + (k-1) \cdot T_i$. Therefore, the link constraint may be expressed as:

$$\forall (BR_i, BR_j) \in E, \forall f_i, f_j \in F_{BR_i, BR_j}, f_i < f_j, \tag{20}$$

$$\forall \alpha \in \left\{ 0, \ldots, \frac{lcm(T_i, T_j)}{T_i} - 1 \right\}, \forall \beta \in \left\{ 0, \ldots, \frac{lcm(T_i, T_j)}{T_j} - 1 \right\}$$

$$\left( \chi_{f_i, BR_i, BR_j} + \alpha \times T_i \geq \chi_{f_j, BR_i, BR_j} + \beta \times T_j + L_{f_i, BR_i, BR_j} \right) \vee$$

$$\left( \chi_{f_j, BR_i, BR_j} + \beta \times T_j \geq \chi_{f_i, BR_i, BR_j} + \alpha \times T_i + L_{f_i, BR_i, BR_j} \right)$$

In an embodiment, a frame isolation constraint is configured to avoid the problem of frame loss in transmitting streams.

(a) a Frame Isolation Constraint without Considering a Transmission Time Period

Figure 6:
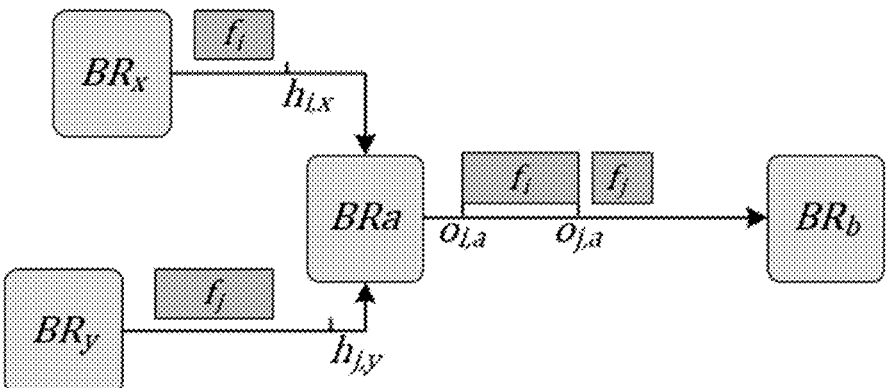
FIG. 6 is a schematic diagram showing an example of a frame isolation constraint.

Firstly, the symbols shown in FIG. 6 are explained as follows.

$$h_{f_i,x} = \chi_{f_i,BR_x,BR_a} + \Gamma \times T_i + L_{f_i,BR_x,BR_a} + ld_{BR_x,BR_a} \tag{21}$$

$$h_{f_j,y} = \chi_{f_j,BR_y,BR_a} + \xi \times T_j + L_{f_j,BR_y,BR_a} + ld_{BR_y,BR_a} \tag{22}$$

$$o_{f_i,a} = \chi_{f_i,BR_a,BR_b} + \Gamma \cdot T_i \tag{23}$$

$$o_{f_j,a} = \chi_{f_j,BR_a,BR_b} + \xi \cdot T_j \tag{24}$$

The frame isolation constraint without considering a transmission time period is used to isolate two different frames, so that one frame may be sent to a shared queue only after the other frame is scheduled from the queue. The constraint may be met in the following three ways. In a first way, $f_i$ is scheduled on a link $(BR_a, BR_b)$ before $f_j$ in the switch $BR_a$ arrives. In a second way, $f_j$ is scheduled on a link $(BR_a, BR_b)$ before $f_i$ in the switch $BR_a$ arrives. In a third way, frames are stored in different queues. It should be noted that all frames in the scheduling time period should be considered, and then multiples $\Gamma$ and $\xi$ are obtained.

$$\forall (BR_a, BR_b) \in E, \forall f_i, f_j \in F_{BR_a,BR_b}, f_i < f_j, \tag{25}$$

$$\forall \Gamma \in \left\{ 0, \dots, \frac{lcm(T_i, T_j)}{T_i} - 1 \right\}, \forall \xi \in \left\{ 0, \dots, \frac{lcm(T_i, T_j)}{T_j} - 1 \right\}:$$

$$\left( h_{f_i,x} \leq h_{f_j,y} - synPrec \right) \vee \left( h_{f_j,y} \leq h_{f_i,x} - synPrec \right) \vee$$

$$\left( \lambda_{f_i,BR_a,BR_b} \neq \lambda_{f_j,BR_a,BR_b} \right)$$

For this constraint, it is assumed that a time instant at which a switch stores a frame in a queue is not related to the transmission time period of the frame. In a case that the frame is stored in a queue after being fully received by the switch, the above constraint (25) may be replaced by the following constraint considering a transmission time period.

(b) a Frame Isolation Constraint Considering a Transmission Time Period

The frame isolation constraint considering a transmission time period is expressed as:

$$\forall (BR_a, BR_b) \in E, \forall f_i, f_j \in F_{BR_a,BR_b}, f_i < f_j, \tag{26}$$

$$\forall \Gamma \in \left\{ 0, \dots, \frac{lcm(T_i, T_j)}{T_i} - 1 \right\}, \forall \xi \in \left\{ 0, \dots, \frac{lcm(T_i, T_j)}{T_j} - 1 \right\}:$$

$$\left( o_{f_i,a} \leq h_{f_j,y} - synPrec \right) \vee \left( o_{f_j,a} \leq h_{f_i,x} - synPrec \right) \vee$$

$$\left( \lambda_{f_i,BR_a,BR_b} \neq \lambda_{f_j,BR_a,BR_b} \right)$$

A stream transmission constraint is to model priority relationships. That is, only after a frame is fully transmitted to a switch and is processed, the switch can transmit the frame.

$$\forall f_i \in F_i, \forall (BR_x, BR_a), (BR_a, BR_b) \in E, f_i \in F_{BR_x,BR_a} \cap F_{BR_a,BR_b}: \tag{27}$$

$$\chi_{f_i,BR_a,BR_b} \geq \chi_{f_i,BR_x,BR_a} + L_{f_i,BR_x,BR_a} + d_{BR_a} + synPrec$$

For an optimization objective, the following objective function is considered to minimize a maximum end-to-end delay (that is, response time) related to a time period of a stream, thereby ensuring the reliability of stream transmission and ensuring that a frame reaches the receiver in a transmission time period. An auxiliary variable $\overline{\omega}$ is introduced, which represents a ratio of an end-to-end delay of a stream to a time period of the stream. In an embodiment, optimal scheduling is achieved in a case that $\overline{\omega}$ is within [0,1]. The optimization objective is expressed as:

$$\forall f_i \in F_i: \varpi = \frac{\chi_{f_i,BR_t,ES_i'} + L_{f_i,BR_t,ES_i'} + ld_{BR_t,ES_i'} - \chi_{f_i,ES_i,BR_j}}{T_i} \tag{28}$$

$$0 \leq \varpi \leq 1$$

By modeling the above constraints and using a solver, and a gate control list of switches on a transmission path of the TT stream is calculated based on the optimal transmission paths $R_{TTstream}{}^i = \{ES_i, BR_a, BR_b, \dots, BR_n, ES'_i\}$ of TT streams between each pair of terminal devices. The output result is shown in the following Table 4.

TABLE 4

| | | (BR_a, BR_b) | | | (BR_b, BR_c) | | | | (BR_n, ES'_i) | | |
|---|---|---|---|---|---|---|---|---|---|---|---|
| Data stream | ES_i sending time | Cache queue ID | Transmission offset | GCL cycle start time | Cache queue ID | Transmission offset | GCL cycle start time | ... Cache queue ID | Transmission offset | GCL cycle start time |
| $f_1$ | $r_{f_1}$ | $\lambda_{f_1, BR_a, BR_b}$ | $\chi_{f_1, BR_a, BR_b}$ | $\phi_{BR_a}$ | $\lambda_{f_1, BR_b, BR_c}$ | $\chi_{f_1, BR_b, BR_c}$ | $\phi_{BR_b}$ | $\dots \lambda_{f_1, BR_n, ES_i}$ | $\chi_{f_1, BR_n, ES'_i}$ | $\phi_{BR_r}$ |
| $f_2$ | $r_{f_2}$ | $\lambda_{f_2, BR_a, BR_b}$ | $\chi_{f_2, BR_a, BR_b}$ | | $\lambda_{f_2, BR_b, BR_c}$ | $\chi_{f_2, BR_b, BR_c}$ | | $\dots \lambda_{f_2, BR_n, ES_i}$ | $\chi_{f_2, BR_n, ES_i}$ | |
| ... | ... | ... | ... | | ... | ... | | ... ... | ... | |
| $f_i$ | $r_{f_i}$ | $\lambda_{f_i, BR_a, BR_b}$ | $\chi_{f_i, BR_a, BR_b}$ | | $\lambda_{f_i, BR_b, BR_c}$ | $\chi_{f_i, BR_b, BR_c}$ | | $\dots \lambda_{f_i, BR_n, ES_i}$ | $\chi_{f_i, BR_n, ES'_i}$ | |

Calculation of successful scheduling results

In step 8, the CNC encapsulates the calculation result in an XML file, configures an XML-based gate scheduling table to TSN switches through the NETCONF protocol, and transmits a stream transmission calculation result to a TSN terminal device via the CUC.

Finally, it should be noted that the above embodiments are only used to illustrate the technical solutions of the present disclosure and are not intended to limit the present disclosure. Although the technical solutions have been described in detail with reference to the preferred embodiments, those skilled in the art should understand that modifications or equivalent substitutions may be made to the technical solutions of the present disclosure without departing from the principle and scope of the technical solutions of the present disclosure. All the modifications and equivalent substitutions to the present disclosure fall within in the protection scope of the present disclosure.

The invention claimed is:

1. A joint optimization method for path selection and gate scheduling in time-sensitive networking (TSN), comprising:

step S1: discovering, by a centralized network configuration module (CNC), a TSN network topology, and abstracting, by the CNC, a network directed graph from the TSN network topology;

step S2: transmitting, by a terminal device, a TSN connection request to a centralized user configuration module (CUC), through a user configuration protocol, and transmitting, by the CUC, the TSN connection request to the CNC via a user network interface (UNI);

step S3: selecting, by the CNC in response to a path selection request, K (K≥3) shortest paths as preselected paths based on a fused path selection and gate scheduling algorithm;

step S4: selecting, by the CNC, m (m≥2) preferred paths from the K preselected paths based on a path criticality $\eta_k$ ($0 \le \eta_k \le 1$);

step S5: using, by the CNC, the m preferred paths as an input to a path selecting stage; to determine an optimal transmission path for TT streams between a pair of sender and receiver based on TSN stream features, link transmission costs and pheromone updating rules; storing, by the CNC, the optimal transmission path in a path information table o; and determining, by the CNC, a transmission path for non-TT streams;

step S6: performing, by the CNC, a traversal process to determine whether there still exists a pair of sender and receiver for which the optimal transmission path has not yet been calculated; in case that there exists a pair of sender and receiver for which the optimal transmission path has not yet been calculated, proceeding to the step S3, wherein all calculated optimal transmission paths of TT streams between all pairs of senders to receivers are stored in the path information table ω; and in a case that there is no path between the sender and the receiver that has not yet been calculated, proceeding to step S7;

step S7: using the path information table ω for the TT streams as an input and configuring a stream transmission constraint, to calculate a gate control list for each of the optimal transmission paths of all pairs of senders to receivers; and step S8: encapsulating, by the CNC, a calculated result into a gate scheduling table; configuring, by the CNC, the gate scheduling table to a TSN switch; and transmitting, by the CNC, a stream transmission calculation result to a TSN terminal device via the CUC.

2. The joint optimization method for path selection and gate scheduling in TSN according to claim 1, wherein the step S1 comprises:

discovering, by the CNC, the TSN network topology through a link discovery protocol LLDP, and abstracting, by the CNC, the network directed graph from the TSN network topology by using a network modeling algorithm;

wherein the TSN network topology is represented as the directed graph of G=(V, E), where V represents a node set in the TSN and V≡(S∪H), S represents a TSN switch set, H represents a terminal device set, E represents an edge set being a set of binary tuples and representing all links in the TSN, wherein E≡{(BR$_i$, BR$_j$)|BR$_i$, BR$_j$∈V, BR$_i$≠BR$_j$ and BR$_i$ is related with BR$_j$}, where (BR$_i$, BR$_j$) represents a link between a switch BR$_i$ and a switch BR$_j$;

each of links (BR$_i$, BR$_j$)∈E is associated with a measurement value list that is represented by a tuples (b, ld), where b∈$\mathbb{R}^+$ and represents a remaining bandwidth of the (BR$_i$, BR$_j$), ld∈$\mathbb{R}^+$ and represents a link delay comprising $d_{BR_i}^{proc}$, $d_{BR_i}^{prop}$ and $d_{BR_i,BR_j}^{prop}$, and ld$_{BR_i, BR_j}$ is bounded;

a stream is an ordered data sequence transmitted from the sender to the receiver according to a requirements; a set of all TSN streams is represented as F; for each of the TSN streams, main parameters comprise: a transmission path R$_i$ of the TSN stream, an end-to-end delay D$_i$ of the TSN stream, a transmission period T$_i$ of the TSN stream, and a size S$_i$ of the TSN stream; and each of the TSN streams F$_i$ is represented as a quadruple F$_i$≡(R$_i$, D$_i$, T$_i$, S$_i$); and a path between an i-th pair of a sender ES$_i$ and a receiver ES'$_i$ includes n switches BR$_1$, BR$_2$, . . . , BR$_n$, and is represented as R$_i$={ES$_i$, BR$_1$, BR$_2$, . . . , BR$_n$, ES'$_i$}, and a maximum length of frame is a maximum transmission unit MTU of an Ethernet.

3. The joint optimization method for path selection and gate scheduling in TSN according to claim 1, wherein the step S2 comprises:

transmitting, by the terminal device to the CUC through the user configuration protocol, the number K of the preselected paths, the number m of the preferred paths selected based on the path criticality $\eta_k$, the maximum number N$_{cyc}$ of cycles of the algorithm, the maximum number N$_{ant}$ of ant, the total quantity Q of pheromones, the transmission period T$_i$ of the TSN stream, the size S$_i$ of the TSN stream, and the delay D$_i$ of the TSN stream, and transmitting, by the CUC, the connection request to the CNC via the user network interface UNI.

4. The joint optimization method for path selection and gate scheduling in TSN according to claim 1, wherein the selecting K shortest paths as preselected paths in the step S3 comprises:

sorting, by using a K-shortest path algorithm KSP, shortest paths in an ascending order for each pair of ES$_i$, ES'$_i$∈H;

inputting the network directed graph G, the sender ES$_i$, the receiver ES'$_i$, and the number K of the paths, and outputting a set p$_K$ of the K paths; and using the set p$_K$ of the K paths as an input for the step S4; wherein the step S3 comprises:

step S31: inputting the network directed graph G, the sender ES$_i$, the receiver ES'$_i$, and the number K of the preselected paths;

step S32: calculating, by the CNC, a shortest path between $ES_i$ and $ES'_i$ using the fused path selection and gate scheduling algorithm; and recording the shortest path as:

$$p_n(n = 1): \; p_n = ES_i \rightarrow BR_a \rightarrow BR_b \rightarrow \dots \rightarrow BR_n \rightarrow ES'_i$$

step S33: determining whether n is less than or equal to K and there are still other candidate paths, wherein in a case that n is less than or equal to K and there are still candidate paths, the process proceeds to step S34, and in a case that n is greater than K or there is no other candidate path, it indicates that the K preselected paths are determined;

step S34: with the calculated $p_n$, calculating $p_{n+1}$ based on deviation points and a Dijkstra algorithm, wherein the deviation points are nodes located on $p_n$, excluding the receiver $ES'_i$, the number of the deviation points is x, and the deviation points are represented as $BR_i(i=1, 2, \dots, x)$;

step S35: traversing the deviation points, wherein the deviation points are traversed starting from $BR_i(i=0)$, and a shortest path from $BR_i$ to the receiver $ES'_i$ is calculated for each of the deviation points;

step S36: using a path from a starting point to $BR_i$ on $p_n$ plus the shortest path from $BR_i$ to the receiver $ES'_i$ as a candidate path for determining $p_{n+1}$, and recording the candidate path in a candidate path list U;

step S37: stopping traversing the deviation points;

step S38: determining whether the candidate path list U is empty;

step S39: in a case that the candidate path list U is not empty, determining a path with a least weight in B as $p_{n+1}$ after traversing all the deviation points, removing the path from U, and recording the path in an preselected path list L; wherein after determining the $p_{n+1}$, if $n+1 \leq K$, the process proceeds to the step S33, and if $n+1 > K$, it indicates that K preselected paths are determined; and step S310: in a case that the candidate path list U is empty (indicating that K preselected paths are determined, determining the set of the paths as $P_K = \{p_1, p_2, \dots, p_n, p_k\} \in P_{sd}$, where $P_{sd}$ represents a set of paths from $BR_i$ to $ES'_i$.

5. The joint optimization method for path selection and gate scheduling in TSN according to claim 1, wherein in the step S4:

the number HC of hops of a path $p_k$ is represented by $p_k.HC$, and is equal to the number of TSN switches on the path $p_k$ excluding a sender and a receiver, and is expressed as:

$$p_k.HC = len(p_k) - 2 \tag{1}$$

a remaining bandwidth SBW of the path $p_k$ is equal to a minimum remaining bandwidth of all links comprised in the path $p_k$, wherein $p_k = \{ES_i, BR_1, BR_2, \dots, BR_n, ES'_i\}$ and $S = len(p_k) - 2$, the remaining bandwidth SBW of the path $p_k$ is expressed as:

$$p_k.SBW = \begin{cases} \min(b_{ES_i,BR_S}, b_{BR_S,ES'_i}) & S = 1 \\ \min(b_{ES_i,BR_1}, b_{BR_S,ES'_i}, b_{BR_1,BR_2}) & S = 2 \\ \min\left(\min_{i=1}^{S-1} b_{BR_i,BR_{i+1}}, b_{ES_i,BR_1}, b_{BR_S,ES'_i}\right) & S \geq 3 \end{cases} \tag{2}$$

an end-to-end delay DL of the path $p_k$ is equal to a sum of delays $ld_{BR_i,BR_{i+1}}$ of the links comprised in the path $p_k$, and is expressed as:

$$p_k.DL = \begin{cases} ld_{ES_i,BR_S} + ld_{BR_S,ES'_i} & S = 1 \\ \sum_{i=1}^{S-1} ld_{BR_i,BR_{i+1}} + ld_{ES_i,BR_1} + ld_{BR_S,ES'_i} & S \geq 2 \end{cases} \tag{3}$$

a function $\Delta(HC, SBW, DL)$ is used to map a path criticality $\eta_k$ of the path $p_k$ to a value ranging from 0 to 1, a path with a maximum $\eta_k$ is selected from the set $p_k$ of the preselected paths as an input path in a path selecting stage, and for the path $p_k \in P_{sd}$, $\eta_k$ is expressed as:

$$\eta_k = p_k.\Delta(HC, SBW, DL) = \omega_1 \frac{HC_{min}}{HC} + \omega_2 \frac{SBW}{SBW_{max}} + \omega_3 \frac{DL_{min}}{DL} \tag{4}$$

$$\omega_1 + \omega_2 + \omega_3 = 1 \tag{5}$$

where $\Sigma_{j=1}^3 \omega_j = 1$, $SBW_{max}$ represents a maximum SBW of all paths $p_k \in P_{sd}$, $HC_{min}$ represents a minimum HC of all the paths $p_k \in P_{sd}$, $DL_{min}$ represents a minimum DL of all the paths $p_k \in P_{sd}$, and a greater $\eta_k$ indicates a smaller number of hops in the network, a greater remaining bandwidth and a less network delay; and the path criticality $\eta_k$ is calculated for each of the path $p_k$, and top m paths with maximum $\eta_k$ are determined as the preferred paths and are recorded in a preferred path set $R_{ant}$.

6. The joint optimization method for path selection and gate scheduling in TSN according to claim 1, wherein the determining an optimal transmission path in the step S5 is performed by using an ant colony algorithm, comprising:

step S51: configuring initialization parameters by outputting an initial path table $R_{ant}$ for the fused path selection and gate scheduling algorithm to a path preselecting stage, and configuring an ant taboo table $R_b$, the maximum number $N_{cyc}$ of cycles of the algorithm, the maximum number $N_{ant}$ of ant, and the total quantity Q of pheromones;

step S52: determining the type of the stream, configuring impact factors $\alpha$ and $\beta$, link weight factor $\delta$ and $\varepsilon$, pheromone volatility coefficient p, and pheromone increment $\Delta\tau$ for the TT streams and for the non-TT streams, placing an ant at the sender, and recording the sender in $R_b$;

step S53: updating the number of cycles by $n_{cyc} = n_{cyc} + 1$;

step S54: updating the number of the ant by $n_{ant} = n_{ant} + 1$;

step S55: selecting, by the ant, a next node using the following equation (6):

$$P(BR_i, BR_j) = \tag{6}$$

$$\begin{cases} \dfrac{\tau(BR_i, BR_j)^\alpha \times \mu(BR_i, BR_j)^\beta}{\sum_{BR_Q \in allow_a} \tau(BR_i, BR_Q)^\alpha \times \mu(BR_i, BR_Q)^\beta}, & BR_j \in allow_a \\ \\ 0, & BR_j \notin allow_a \end{cases}$$

$$\mu(BR_i, BR_j) = \delta \times b_{BR_i, BR_j} + \frac{\varepsilon}{ld_{BR_i, BR_j}} \tag{7}$$

where P ($BR_i$, $BR_j$) represents a transmission probability of an ant "a" from a node $BR_i$ to a node $BR_j$; $allow_a$ represents a set of links from a node to a next node; a greater $\alpha$ indicates a stronger guiding role of the pheromones; a greater $\beta$ indicates a greater influence of path distance information on the ant making a decision and the more greedy on a current effect; $\delta$ and $\varepsilon$ represents weight factors, $\delta+\varepsilon=1$, $0<\delta<1$, $0<\varepsilon<1$, $\delta$ and $\varepsilon$ are determined based on the current type of stream, and $\delta$ is less than $\varepsilon$ in a case of TT stream; $\tau(BR_i, BR_j)$ represents the amount of pheromones of a link ($BR_i$, $BR_j$); $\mu(BR_i, BR_j)$ represents a heuristic factor for node selection; $b_{BR_i, BR_j}$ represents a remaining bandwidth of the link ($BR_i$, $BR_j$); and $ld_{BR_i, BR_j}$ represents a delay of the link ($BR_i$, $BR_j$);

step S56: determining whether the ant reaches the receiver; in a case that the ant does not reach the receiver, proceeding to the step S55; and in a case that the ant reaches the receiver, recording a path traveled by the ant in a path table $R_{te}$, recording nodes of the path in the taboo table $R_b$ to avoid crossing with a path of another ant, and proceeding to step S57;

step S57: determining whether $n_{ant}$ is equal to $N_{ant}$; in a case that $n_{ant}<N_{ant}$, proceeding to the step S54; and in a case that $n_{ant}=N_{ant}$, selecting a path having a lowest transmission cost TV from $R_{te}$ as an optimal path for the current cycle, recording the path in a best path set R, and proceeding to step S58;

step S58: determining whether $n_{cyc}$ is equal to $N_{cyc}$; in a case that $n_{cyc}\neq N_{cyc}$, proceeding to step S53, updating the pheromones in the link using the following equation (8), and clearing $R_b$; and in a case that $n_{cyc}=N_{cyc}$, proceeding to step S59;

$$\tau(BR_i, BR_j) = \begin{cases} (1-\rho)\times\tau(BR_i, BR_j) + \Delta\tau(BR_i, BR_j) & (BR_i, BR_j) \in R_{ant} \quad (8) \\ (1-\rho)\times\tau(BR_i, BR_j) & (BR_i, BR_j) \notin R_{ant} \end{cases}$$

where $\rho$ represents the pheromone volatility coefficient, and $0<\rho<1$; $\tau(BR_i, BR_j)$ represents the amount of pheromones of the link ($BR_i$, $BR_j$); and $\Delta\tau(BR_i, BR_j)$ represents the pheromone increment of the link ($BR_i$, $BR_j$), which is determined based on the type of the TSN data stream, and is expressed as:

$$\Delta\tau(BR_i, BR_j) = \tag{9}$$

$$\begin{cases} \dfrac{Q}{\sum_{i=1}^{n}\sum_{j=1}^{n}[ld_{(BR_i, BR_j)}\times\varsigma(BR_i, BR_j)]} & TT \text{ stream} \\ \\ \dfrac{Q}{\min(b_{(BR_i, BR_j)}\times\varsigma(BR_i, BR_j))} & non\text{-}TT \text{ stream} \end{cases}$$

where Q represents the total quantity of the pheromones; $ld_{(BR_i, BR_j)}$ represents the transmission delay of the link ($BR_i$, $BR_j$); and a path selection coefficient $\varsigma(BR_i, BR_j)$ is expressed as:

$$\varsigma(BR_i, BR_j) = \begin{cases} 1 & (BR_i, BR_j) \in R_{ant} \\ 0 & (BR_i, BR_j) \notin R_{ant} \end{cases} \tag{10}$$

step S59: outputting an optimal transmission path for the TT streams and an optimal transmission path for the non-TT streams based on the type of the TSN stream, wherein in a case of the TT streams $f_i$, a path with a minimum delay is selected from the path set R as the optimal path which is represented as $R^i_{TT_{stream}}$; and in a case of the non-TT streams $f_i$, $N_{non\text{-}TT\ stream}$ ($N_{non\text{-}TT\ stream}\geq 2$) paths are selected from the path set R as optimal paths and are forwarded.

7. The joint optimization method for path selection and gate scheduling in TSN according to claim 1, wherein in the step S7:

a cycle period GC of the gate control list is expressed as:

$$GC = lcm(T) \tag{11}$$

where lcm represents a least common multiple, and T represents time periods of all data streams and is expressed as:

$$T=\{f_0 \cdot T_0, f_1 \cdot T_1, \ldots, f_n \cdot T_n\}$$

where $f_n \cdot T_n$ represents a time period $T_n$ of a stream $f_n$; wherein a time distance between subsequent frames of a stream $f_i \in F$ is always equal to $T_i$, a transmission offset of the TT stream $f_i$ on ($BR_i$, $BR_j$) is $\chi_{f_i, BR_i, BR_j} \in E$, $f_i \in F_{BR_i, BR_j}$, an ID of a queue storing $F_{f_i, a, b}$ is $\lambda_{f_i, BR_i, BR_j}$, ($BR_i$, $BR_j$)$\in E$, and a time period $L_{f_i, BR_i, BR_j}$ for transmitting a data frame of the stream $f_i$ on the link ($BR_i$, $BR_j$) is obtained by using the following equation (12):

$$L_{f_i, BR_i, BR_j} = \frac{8 \cdot p_i}{C_{BR_i, BR_j}} \tag{12}$$

based on a GCL transmission rule, a length of a slot (LOS) is analyzed, and a maximum length of the slot is obtained by using the following equation (13):

$$MAX(LOS) = GCD(T) \tag{13}$$

the maximum LOS is equal to a greatest common divisor of time periods of data streams;

a minimum length of the slot is obtained by using the following equation (14):

$$\min(LOS) = \frac{LOG}{C_{BR_i,BR_j}} + d_{BR_i}^{proc} + d_{BR_i}^{prop} + synPre \tag{14}$$

where LOG represents a length of a transmission queue, and $$\frac{LOG}{C_{BR_i,BR_j}}$$

represents a time period for transmitting the last 1 byte to the link in a case that all queue resources are occupied;

a transmission path is expressed as $\{ES_i, BR_1, BR_2, \ldots, BR_n, ES'_i\}$, and a GCL cycle start time instant $\phi_{BR_n}$ of a switch $BR_n$ is calculated by using the following equation (15):

$$\phi_{BR_n} = r_{f_i}^F + L_{f_i,ES_i,BR_1} + \sum_{i=1}^{n} d_{BR_i}^{proc} + \tag{15}$$

$$\sum_{i=1}^{n} d_{BR_i}^{prop} + \sum_{j=2}^{n} L_{f_i BR_{j-1},BR_j} + synPre$$

where $r_{f_i}^F$ represents a time instant at which the sender transmitting a first data frame, $L_{f_i,ES_i,BR_1}$ represents a time period for transmitting a data frame of the stream $f_i$ on a link $(ES_i, BR_1)$, $d_{BR_i}^{proc}$ represents a processing delay of $BR_i$, $d_{BR_i}^{prop}$ represents a transmission delay of $BR_i$, $L_{f_i,BR_{j-1},BR_j}$ represents a time period for transmitting a data frame of the stream $f_i$ on a link $(BR_{j-1}, BR_j)$, and synPre represents a maximum difference in time synchronizations between two node devices;

a delay D from a switch to a next switch is expressed as:

$$D = d_{BR_n}^{proc} + d_{BR_{n-1}}^{prop} + d_{BR_{n-1},BR_n}^{prop} \tag{16}$$

where $d_{BR_n}^{proc}$ represents a processing delay of $BR_n$, $d_{BR_{n-1}}^{prop}$ represents a transmission delay of $BR_{n-1}$, and $d_{BR_{n-1},BR_n}^{prop}$ represents a propagation delay in $(BR_{n-1}, BR_n)$;

an end-to-end delay constraint is expressed as:

$$\left(d_{ES_i,BR_j}^{prop} + d_{BR_i,ES'_i}^{prop}\right) + \sum_{i=1}^{j-1} d_{BR_i,BR_{i+1}}^{prop} + \sum_{i=1}^{j} d_{BR_i}^{proc} \le D_i \tag{17}$$

a frame constraint is expressed as:

$$\forall f_i \in F_i : \chi_{f_i,ES_i,BR_j} \ge r_{f_i} \tag{18}$$

$$\forall f_i \in F_i : \chi_{f_i,BR_t,ES'_i} \ge \tilde{d}_i - L_{f_i,BR_t,ES'_i} - ld_{BR_t,ES'_i} \tag{19}$$

a link constraint are expressed as:

$$\forall (BR_i, BR_j) \in E, \forall f_i, f_j \in F_{BR_i,BR_j}, f_i < f_j, \tag{20}$$

$$\forall \alpha \in \left\{0, \ldots, \frac{lcm(T_i, T_j)}{T_i} - 1\right\}, \forall \beta \in \left\{0, \ldots, \frac{lcm(T_i, T_j)}{T_j} - 1\right\}$$

$$\left(\chi_{f_i,BR_i,BR_j} + \alpha \times T_i \ge \chi_{f_j,BR_i,BR_j} + \beta \times T_j + L_{f_j,BR_i,BR_j}\right) \vee$$

$$\left(\chi_{f_j,BR_i,BR_j} + \beta \times T_j \ge \chi_{f_i,BR_i,BR_j} + \alpha \times T_i + L_{f_i,BR_i,BR_j}\right)$$

a frame isolation constraint without considering a transmission time period is expressed as:

$$\forall (BR_a, BR_b) \in E, \forall f_i, f_j \in F_{BR_a,BR_b}, f_i < f_j, \tag{21}$$

$$\forall \Gamma \in \left\{0, \ldots, \frac{lcm(T_i, T_j)}{T_i} - 1\right\}, \forall \xi \in \left\{0, \ldots, \frac{lcm(T_i, T_j)}{T_j} - 1\right\}:$$

$$\left(h_{f_i,x} \le h_{f_j,y} - synPrec\right) \vee$$

$$\left(h_{f_j,y} \le h_{f_i,x} - synPrec\right) \vee \left(\lambda_{f_i,BR_a,BR_b} \ne \lambda_{f_j,BR_a,BR_b}\right)$$

where $h_{f_i,x} = \chi_{f_i,BR_x,BR_a} + \Gamma \times T_i + L_{f_i,BR_x,BR_a} + ld_{BR_x,BR_a}$ (22)

$$h_{f_j,y} = \chi_{f_j,BR_y,BR_a} + \xi \times T_j + L_{f_j,BR_y,BR_a} + ld_{BR_y,BR_a} \tag{23}$$

$$o_{f_i,a} = \chi_{f_i,BR_a,BR_b} + \Gamma \cdot T_i \tag{24}$$

$$o_{f_j,a} = \chi_{f_j,BR_a,BR_b} + \xi \cdot T_j \tag{25}$$

a frame isolation constraint considering a transmission time period is expressed as:

$$\forall (BR_a, BR_b) \in E, \forall f_i, f_j \in F_{BR_a,BR_b}, f_i < f_j, \tag{26}$$

$$\forall \Gamma \in \left\{0, \ldots, \frac{lcm(T_i, T_j)}{T_i} - 1\right\}, \forall \xi \in \left\{0, \ldots, \frac{lcm(T_i, T_j)}{T_j} - 1\right\}:$$

$$\left(o_{f_i,a} \le h_{f_j,y} - synPrec\right) \vee$$

$$\left(o_{f_j,a} \le h_{f_i,x} - synPrec\right) \vee \left(\lambda_{f_i,BR_a,BR_b} \ne \lambda_{f_j,BR_a,BR_b}\right)$$

a stream transmission constraint is expressed as:

$$\forall f_i \in F_i, \forall (BR_x, BR_a), (BR_a, BR_b) \in E, f_i \in F_{BR_x,BR_a} \cap F_{BR_a,BR_b}: \tag{27}$$

$$\chi_{f_i,BR_a,BR_b} \ge \chi_{f_i,BR_x,BR_a} + L_{f_i,BR_x,BR_a} + d_{BR_a} + synPrec$$

an optimization objective is expressed as:

$$\forall f_i \in F_i : \varpi = \frac{\chi_{f_i,BR_t,ES'_i} + L_{f_i,BR_t,ES'_i} + ld_{BR_t,ES'_i} - \chi_{f_i,ES_i,BR_j}}{T_i} \tag{28}$$

$$0 \le \varpi \le 1$$

an auxiliary variable w represents a ratio of an end-to-end delay of a stream to a time period of the stream, and optimal scheduling is achieved in a case that @ is within [0,1]; and a solver is used to solve, under the above constraints, a gate control list of switches for each optimal transmission path $R_{TTstream}^i = \{ES_i, BR_c, BR_b, \ldots, BR_n, ES'_i\}$ of TT streams between all pairs of terminal devices.

* * * * *